(12) United States Patent
Furukawa et al.

(10) Patent No.: US 7,862,931 B2
(45) Date of Patent: Jan. 4, 2011

(54) LEAD-BASED ALLOY FOR LEAD-ACID BATTERY, SUBSTRATE FOR LEAD-ACID BATTERY AND LEAD-ACID BATTERY

(75) Inventors: Jun Furukawa, Iwaki (JP); Yasuyuki Nehyo, Iwaki (JP); Yutaka Mori, Funabashi (JP); Tomohiro Hiraki, Fujioka (JP)

(73) Assignees: The Furukawa Battery Co., Ltd., Yokohama-shi, Kanagawa (JP); Toho Zinc Co., Ltd., Tokyo (JP)

( * ) Notice: Subject to any disclaimer, the term of this patent is extended or adjusted under 35 U.S.C. 154(b) by 0 days.

(21) Appl. No.: 10/754,111

(22) Filed: Jan. 8, 2004

(65) Prior Publication Data

US 2004/0142243 A1    Jul. 22, 2004

Related U.S. Application Data

(63) Continuation of application No. PCT/JP03/04769, filed on Apr. 15, 2003.

(30) Foreign Application Priority Data

| Apr. 18, 2002 | (JP) | 2002-116593 |
| Oct. 18, 2002 | (JP) | 2002-304249 |
| Oct. 18, 2002 | (JP) | 2002-304286 |

(51) Int. Cl.
    *H01M 4/56* (2006.01)
    *H01M 4/58* (2010.01)
(52) U.S. Cl. ............... 429/228; 429/225; 429/226; 429/218.1
(58) Field of Classification Search .......... 429/228, 429/225, 226, 218.1
    See application file for complete search history.

(56) References Cited

U.S. PATENT DOCUMENTS

| 3,867,200 A | | 2/1975 | Daniels, Jr. |
| 4,233,070 A | | 11/1980 | McWhinnie et al. |
| 4,329,408 A | * | 5/1982 | Mao et al. ............ 429/228 |
| 4,343,872 A | * | 8/1982 | Nees et al. ............ 429/245 |
| 4,358,518 A | | 11/1982 | Matter |
| 4,443,918 A | | 4/1984 | Morinari et al. |
| 4,906,540 A | * | 3/1990 | Hoshihara et al. ......... 429/242 |
| 5,298,350 A | | 3/1994 | Rao |
| 5,874,186 A | * | 2/1999 | Rao et al. ............ 429/242 |
| 6,117,594 A | | 9/2000 | Taylor et al. |
| 6,267,923 B1 | * | 7/2001 | Albert et al. ............ 420/564 |
| 6,342,110 B1 | | 1/2002 | Palumbo |
| 2001/0009743 A1 | * | 7/2001 | Prengaman ............ 429/245 |
| 2002/0182500 A1 | | 12/2002 | Mercado et al. |
| 2003/0017399 A1 | | 1/2003 | Zhang et al. |
| 2005/0066498 A1 | | 3/2005 | Ozaki |
| 2005/0158629 A1 | | 7/2005 | Furukawa et al. |
| 2008/0107960 A1 | | 5/2008 | Furukawa et al. |

FOREIGN PATENT DOCUMENTS

| DE | 26 19 113 | 11/1977 |
| EP | 1 041 164 A1 | 10/2000 |
| EP | 1 264 907 A1 | 12/2002 |
| EP | 1 278 256 A2 | 1/2003 |
| FR | 2 766 622 A1 | 1/1999 |
| GB | 1597270 | 9/1981 |
| JP | 56-106369 A | 8/1981 |
| JP | 57-208068 A | 12/1982 |
| JP | 58-223263 * | 12/1983 |
| JP | 56-141176 B2 | 10/1989 |
| JP | 7-6767 A | 1/1995 |
| JP | 7-108320 A | 4/1995 |
| JP | 10-294113 A | 11/1998 |
| JP | 2000-504783 A | 4/2000 |
| JP | 2002-134116 A | 5/2002 |
| JP | 2002-194463 A | 7/2002 |
| JP | 2002-246031 A | 8/2002 |
| JP | 2002-329498 A | 11/2002 |
| JP | 2003-151563 A | 5/2003 |
| WO | WO 97/30183 A1 | 8/1997 |
| WO | WO 01/26171 A1 | 4/2001 |
| WO | WO 01/53549 A1 | 7/2001 |
| WO | WO 02/069421 A2 | 9/2002 |
| WO | WO 03/092101 A1 | 11/2003 |
| WO | WO 2004/104244 A1 | 12/2004 |

OTHER PUBLICATIONS

Japanese Office Action (Notice of Reasons for Rejection0 dated Jun. 9, 2009, which issued in Japanese Patent Application 2004-501978, and an English-language translation thereof.

* cited by examiner

*Primary Examiner*—Patrick Ryan
*Assistant Examiner*—Julian Mercado
(74) *Attorney, Agent, or Firm*—Holtz, Holtz, Goodman & Chick, P.C.

(57) ABSTRACT

Provided is a lead-based alloy for a lead-acid battery, comprising not less than 0.02% and less than 0.05% by weight of calcium, not less than 0.4% and not more than 2.5% by weight of tin, not less than 0.005% and not more than 0.04% by weight of aluminum, not less than 0.002% and not more than 0.014% by weight of barium, and the balance of lead and unavoidable impurities.

9 Claims, 7 Drawing Sheets

LEAD-BASED ALLOY FOR LEAD-ACID BATTERY, SUBSTRATE FOR LEAD-ACID BATTERY AND LEAD-ACID BATTERY

CROSS-REFERENCE TO RELATED APPLICATIONS

This is a Continuation Application of PCT Application No. PCT/JP03/04769, filed Apr. 15, 2003, which was not published under PCT Article 21(2) in English.

This application is based upon and claims the benefit of priority from the prior Japanese Patent Applications No. 2002-116593, filed Apr. 18, 2002; No. 2002-304249, filed Oct. 18, 2002; and No. 2002-304286, filed Oct. 18, 2002, the entire contents of all of which are incorporated herein by reference.

BACKGROUND OF THE INVENTION

1. Field of the Invention

The present invention relates to a lead-based alloy for a lead-acid battery, a grid for a lead-acid battery, and a lead-acid battery, particularly, to a lead-based alloy for a lead-acid battery, a grid for a lead-acid battery, and a lead-acid battery, which exhibit excellent corrosion resistance and excellent mechanical strength when used for a grid and which are adapted for gravity casting, continuous casting and a rolling process.

2. Description of the Related Art

In recent years, the temperature within the engine compartment of a vehicle is markedly elevated because of the increase in the facilities and the design that eliminates an extra space. Therefore, the lead-acid battery mounted in the vehicle is kept overcharged and operated under severe conditions. As a result, corrosion of the grid and deformation by elongation of the grid, which is called growth, are generated in the positive plate included in the lead-acid battery so as to shorten the life of the lead-acid battery. Naturally, it is of high importance to overcome these problems.

To be more specific, it is necessary for the grid of the lead-acid battery to have a reasonable mechanical strength in order to avoid the deformation during the manufacturing process of the lead-acid battery. It should be noted in this connection that the deformation by elongation, i.e., the generation of the so-called "growth", is derived from the elongation stress generated by the corroded material formed during use of the battery. The generation of the growth is a problem that is more serious than the problem generated by insufficient mechanical strength. The growth tends to impair the electrical connection between the grid and the active material so as to give rise to serious defects such as a decrease in the battery capacity and short-circuiting caused by the deformation of the plate.

It is possible to lower the growth to some extent by improving the mechanical strength of the grid. However, the growth is a phenomenon that takes place as a result of the mutual function between the mechanical strength of the grid and the corrosion of the grid. Therefore, the effect of improving the mechanical strength of the grid is rendered limitative unless the corrosion is lowered.

It should also be noted that the lead-acid battery is strongly required to be free from maintenance in view of convenience in handling. It was customary for the grid constituting the positive electrode of the lead-acid battery to be formed of a lead-based alloy comprising 0.06 to 0.10% by weight of Ca, 1.0 to 2.0% by weight of Sn, 0.005 to 0.04 by weight of Al, and the balance of Pb. However, it was impossible for even the grid made of the lead-based alloy of the particular composition to produce a sufficient effect of improving the corrosion resistance and suppressing the growth, resulting in failure to overcome the problem in terms of the life of the lead-acid battery.

Several ideas have already been proposed in an attempt to overcome the difficulty. For example, proposed in WO-97/30183 is a grid for a lead-acid battery made of a lead-based alloy comprising 0.05 to 0.12 by weight of Ca, not more than 3% by weight of Sn, 0.002 to 0.04% by weight of Al, and not more than 0.02 by weight of Ba. It is reported that the grid for the lead-acid battery of the particular composition is capable of maintaining a reasonable mechanical strength over the entire life of the battery. Proposed in U.S. Pat. No. 4,233,070 is a grid for a lead-acid battery. It is reported that the mechanical strength of the grid for the lead-acid battery can be improved without impairing the corrosion resistance by adding 0.005 to 0.05% by weight of Mg to a lead-based alloy comprising alkaline earth metals such as Ca, Sr and Ba as well as Sn and Al. Proposed in U.S. Pat. No. 4,358,518 is a grid for a lead-acid battery made of an alloy comprising 0.03 to 0.04% by weight of Ca, 0.15 to 0.4% by weight of Sr, 0.15 to 0.9% by weight of Sn, and 0.025 to 0.07% by weight of Ba. It is reported that the grid for the lead-acid battery made of the alloy of the particular composition permits improving both the mechanical strength and the corrosion resistance of the grid. Further, proposed in U.S. Pat. No. 5,298,350 is a lead alloy, which exhibits a long life under high temperatures, comprising 0.025 to 0.06% by weight of Ca, 0.3 to 0.7% by weight of Sn, and 0.015 to 0.045% by weight of Ag.

As pointed out above, the U.S. patents quoted above teach that Ba contained in the lead-based alloy for the lead-acid battery is effective in improving the mechanical strength of the alloy. Also, WO-97/30183 quoted above teaches that prescribed amounts of Ca and Ba are effective for achieving the mechanical strength required for the grid of the positive electrode included in the battery.

However, any of the prior arts quoted above, which are directed to the alloy containing Ba, is insufficient for improving both the mechanical strength and the corrosion resistance of the grid. This is also the case with U.S. Pat. No. 5,298,350 quoted above, which teaches the addition of Ag. To be more specific, the growth is certainly suppressed in this prior art in accordance with some improvement in the corrosion resistance and the mechanical strength. However, the brittleness is also increased in this prior art so as to give rise to a decisive defect such as breakage of the grid in some cases. Such being the situation, it was difficult to obtain a lead-acid battery of a long life.

As described above, the conventional lead-based alloy used for the manufacture of the grid for a lead-acid battery was incapable of withstanding sufficiently stably operation for a long time under high temperature.

On the other hand, the battery for a vehicle is strongly required to be rendered lightweight in view of fuel consumption and saving natural resources. In order to decrease the thickness of the grid in an attempt to meet the particular requirement, it is necessary to improve both the corrosion resistance and the mechanical strength of the grid at a high level.

Further, in accordance with increase in the battery voltage for a vehicle from 12 V to 36 V and with the popularization of a hybrid vehicle (HEV), it is of high emergency to further promote the environmental improvement and the improvement in the fuel consumption. Under such new application, it is necessary to achieve a high current charge and discharge under high temperatures, and the long life achieved by the improvement in the corrosion resistance is further required. To decrease the thickness of the plate for increasing the specific surface area of the plate is effective for improving the high current charge-discharge characteristics. However, the problems in respect of the corrosion resistance and the growth generation are rendered more prominent if the thickness of the plate is decreased.

Incidentally, the problems and the subject matters described above are not limited to the battery for a vehicle. Problems and subject matters substantially equal to those described above are also inherent in the battery for a back up power source and the battery for energy storage, which are widely used in, for example, IT.

BRIEF SUMMARY OF THE INVENTION

An object of the present invention is to provide a lead-based alloy for a lead-acid battery, the alloy containing prescribed amounts of Ca and Ba and exhibiting excellent corrosion resistance and excellent mechanical strength.

Another object of the present invention is to provide a grid for a lead-acid battery, which is made of the lead-based alloy noted above and which can be used stably for a long time even under high temperature, and a lead-acid battery comprising a positive electrode including the grid noted above.

According to a first embodiment of the present invention, there is provided a lead-based alloy for a lead-acid battery, comprising not less than 0.02% and less than 0.05% by weight of calcium, not less than 0.4% and not more than 2.5% by weight of tin, not less than 0.005% and not more than 0.04% by weight of aluminum, not less than 0.002% and not more than 0.014% by weight of barium, and the balance of lead and unavoidable impurities.

According to a second embodiment of the present invention, there is provided a grid for a lead-acid battery made of a lead-based alloy comprising not less than 0.02% and less than 0.05% by weight of calcium, not less than 0.4% and not more than 2.5% by weight of tin, not less than 0.005% and not more than 0.04% by weight of aluminum, not less than 0.002% and not more than 0.014% by weight of barium, and the balance of lead and unavoidable impurities.

Further, according to a third embodiment of the present invention, there is provided a lead-acid battery comprising a positive electrode including a grid, which is made of a lead-based alloy comprising not less than 0.02% and less than 0.05% by weight of calcium, not less than 0.4% and not more than 2.5% by weight of tin, not less than 0.005% and not more than 0.04% by weight of aluminum, not less than 0.002% and not more than 0.014% by weight of barium, and the balance of lead and unavoidable impurities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
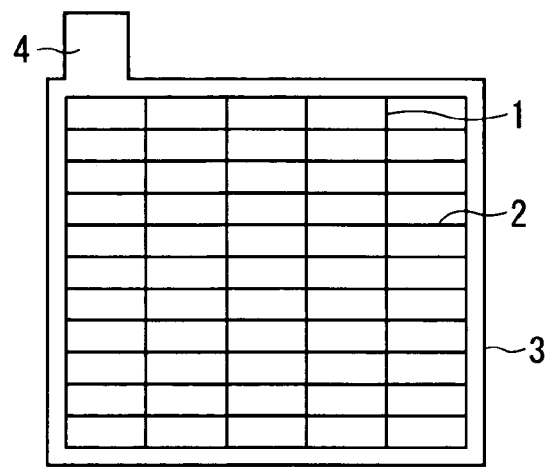
FIG. 1 is a plan view showing the construction of a grid for a lead-acid battery according to one embodiment of the present invention.

A lead-based alloy for a lead-acid battery, a grid for a lead-acid battery, and a lead-acid battery of the present invention will now be described in detail.

(Lead-Based Alloy for Lead-Acid Battery)

The lead-based alloy for a lead-acid battery according to the present invention comprises calcium (Ca) in an amount not more than 0.02% by weigh and less than 0.05% by weight, tin (Sn) in an amount not less than 0.4% by weight and not more than 2.5% by weight, aluminum (Al) in an amount not less than 0.005% by weight and not more than 0.04% by weight, barium (Ba) in an amount not less than 0.002% by weight and not more than 0.014% by weight, and the balance of lead (Pb) and unavoidable impurities.

Described in the following are the function performed by each of the component elements contained in the lead-based alloy for a lead-acid battery of the present invention and the reasons for defining the contents of these components elements.

1) Ca

Calcium (Ca) produces the function of increasing the mechanical strength of the lead-based alloy. If the Ca content of the alloy is less than 0.02% by weight, it is impossible to improve sufficiently the mechanical strength of the alloy. On the other hand, if the Ca content of the alloy is not less than 0.05% by weight, the corrosion resistance of the alloy tends to be lowered. It is mode desirable for the Ca content of the alloy to fall within a range of between 0.03% by weight and 0.045% by weight.

2) Ba

Barium (Ba) produces the function of improving the mechanical strength of the lead-based alloy. If the lead-based alloy contains Ba in an amount of 0.002 to 0.014% by weight as well as Ca in an amount not less than 0.02% by weight and less than 0.05% by weight, it is possible to improve the corrosion resistance of the alloy while increasing the mechanical strength of the alloy.

If the Ba content is less than 0.002% by weight, it is difficult to improve sufficiently the mechanical strength of the alloy. On the other hand, if the Ba content exceeds 0.014% by weight, the corrosion resistance of the alloy is rapidly lowered. It is more desirable for the Ba content of the alloy to fall within a range of between 0.002% by weight and 0.010% by weight.

The lead-based alloy of the present invention having the Ca content and the Ba content defined as above permits improving both the corrosion resistance and the mechanical strength of the lead-based alloy. As a result, if the lead-based alloy of the present invention is used for preparing a grid for a lead-acid battery, e.g., a grid, it is possible to achieve a long life of the lead-acid battery. It should be noted in this connection that the interface between the grid of the lead-based alloy and the active material is densified without relying on the improvements in the corrosion resistance and the mechanical strength of the lead-based alloy so as to develop a new effect that, for example, an electrical conductivity between the grid and the active material with a corroded layer interposed therebetween can be maintained for a long time. As a result, it is possible for the life of the battery to be prolonged to exceed the evaluation based on the corrosion resistance and the mechanical strength of the battery.

3) Sn

Tin (Sn) produces the function of improving the flowability of the molten lead-based alloy and the mechanical strength of the lead-based alloy. Also, where the lead-based alloy of the present invention is used for forming a grid for a lead-acid battery the corroded layer is doped with Sn eluted onto the grid interface so as to produce the effect of improving the electrical conductivity because of the semiconductor effect.

If the Sn content is less than 0.4% by weight, it is difficult to obtain sufficiently the effect noted above. In addition, the corrosion resistance of the alloy tends to be lowered. On the other hand, if the Sn content exceeds 2.5% by weight, the grain size of the lead-based alloy are rendered coarse, with the result that it is possible for the grain boundary corrosion to proceed to exceed the apparent corrosion. It is more desirable for the Sn content of the lead-based alloy to fall within a range of between 0.6% by weight and 2.5% by weight.

4) Al

Aluminum (Al) produces the function of suppressing the loss of Ca and Ba caused by the oxidation of the molten alloy. If the Al content of the alloy is less than 0.005% by weight, it is difficult for Al to produce its effect sufficiently. On the other hand, if the Al content exceeds 0.04% by weight, Al tends to be precipitated in the form of a dross.

It is desirable for the unavoidable impurities to include, for example, copper (Cu) in an amount not more than 0.002% by weight, arsenic (As) in an amount not more than 0.003% by weight, antimony (Sb) in an amount not more than 0.003% by weight, zinc (Zn) in an amount not more than 0.005% by weight, iron (Fe) not more than 0.004% by weight, cadmium (Cd) in an amount not more than 0.003% by weight, nickel (Ni) in an amount not more than 0.002% by weight, zirconium (Zr) in an amount not more than 0.01% by weight, and tellurium (Te) in an amount not more than 0.001% by weight.

It is desirable for the lead-based alloy of for a lead-acid battery of the present invention to comprise further silver (Ag) in an mount not less than 0.005% by weight and not more than 0.07% by weight, bismuth (Bi) in an amount not less than 0.01% by weight and not more than 0.10% by weight, and thallium (Tl) in an amount not less than 0.01% by weight and not more than 0.05% by weight. These elements contained in the lead-based alloy permit further improving the mechanical strength of the alloy. Also, Ag, Bi and Tl contained in the lead-based alloy of the present invention produce the effect of improving the creep rupture strength of the alloy under high temperatures as described herein later.

5) Ag

Silver (Ag) produces the function of markedly improving mechanical strength, particularly, the resistance to creep under high temperatures, of the alloy. If the Ag content of the alloy is less than 0.005% by weight, the alloy is incapable of sufficiently exhibiting its effect. On the other hand, if the Ag content of the alloy exceeds 0.07% by weight, heat cracks tend to be generated in the alloy in the casting step during manufacture of a grid for a lead-acid battery. It is more desirable for the Ag content of the alloy to fall within a range of between 0.01% by weight and 0.05% by weight.

6) Bi

Bismuth (Bi) also produces the function of improving the mechanical strength of the alloy. The effect produced by Bi is smaller than that produced by Ag. However, since Bi is cheaper than Ag, it is economically advantageous to use Bi. If the Bi content of the alloy is less than 0.01% by weight, it is difficult for the alloy to produce a sufficient effect of improving the mechanical strength. On the other hand, if the Bi content exceeds 0.10% by weight, the corrosion resistance of the alloy tends to be impaired. It is more desirable for the Bi content to fall within a range of between 0.03% by weight and 0.05% by weight.

7) Tl

Thallium (Tl) also produces the function of improving the mechanical strength of the alloy. Also, Tl is cheap and, thus, it is advantageous in economy to use Tl. If the Tl content is less than 0.001% by weight, the effect produced by Tl fails to be exhibited sufficiently in the alloy. On the other hand, if the Tl content exceeds 0.05% by weight, the corrosion resistance of the alloy tends to be impaired. It is more desirable for the Tl content to fall within a range of between 0.005% by weight and 0.05% by weight.

The lead-based alloy for a lead-acid battery according to the present invention has a Ca content lower than that of the conventional lead alloy. As a result, the lead-based alloy of the present invention immediately after the casting of a part of the lead-acid battery such as a grid of an electrode is soft and, thus, tends to be deformed. The tendency to be deformed easily can be improved by rapidly cooling the grid of the lead-acid battery after the casting step by a water cooling or an air cooling. As a result, it is possible to prevent the part of the lead-acid battery from being deformed when the part is handled.

It is also possible to apply a heat treatment to the grid of the lead-acid battery after the casting step so as to permit the grid to be subjected to an age-hardening. As a result, the corrosion resistance of the grid can be further improved. Also, when a paste containing an active material is loaded in the grid, which is one of the parts of the lead-acid battery, a strong shearing stress is applied to the grid. However, where the grid is subjected to the age-hardening, the grid is prevented from being deformed by the application of the shearing stress.

The heat treatment noted above is applied at 80 to 150° C. for 0.5 to 10 hours. In other words, an appropriate mechanical strength and hardness can be imparted to the part of the lead-acid battery in a short time by the heat treatment. It is more desirable to carry out the heat treatment at 90 to 120° C. for 1 to 5 hours.

(Grid for Lead-Acid Battery)

The grid for a lead-acid battery of the present invention is formed of a lead-based alloy comprising not less than 0.02% and less than 0.05% by weight of calcium, not less than 0.4% and not more than 2.5% by weight of tin, not less than 0.005% and not more than 0.04% by weight of aluminum, not less than 0.002% and not more than 0.014% by weight of barium, and the balance of lead and unavoidable impurities.

The function performed by each of the components of the lead-based alloy and the reasons for the definition of the contents of these component elements are equal to those described above in conjunction with the lead-based alloy for a lead-acid battery.

As described previously, it is desirable for the lead-based alloy to further contain at least one additional element selected from the group consisting of silver (Ag) in an amount of 0.005 to 0.07% by weight, bismuth (Bi) in an amount of 0.01 to 0.10% by weight, and thallium (Tl) in an amount of 0.001 to 0.05% by weight.

The grid for a lead-acid battery of the present invention is shaped like, for example, a lattice. As shown in FIG. 1, the grid is constructed such that a plurality of vertical lattice elements 1 and a plurality of lateral lattice elements 2 are arranged to cross each other at right angles, and the resultant lattice structure is surrounded by a frame lattice elements 3. Also, a lug 4 integrally projects outward from one of the corner portions of the frame lattice elements 3.

Incidentally, the construction of the grid is not limited to that shown in FIG. 1. For example, it is possible for the vertical lattice elements to be radially arranged from the frame structure having the lug mounted thereto to the lateral lattice elements.

It is possible to manufacture directly the grid for a lead-acid battery of the present invention in a lattice shape, by, for example, a casting method such as a gravity casting method or a continuous casting method of the lead-based alloy. It is also possible to manufacture the grid for the lead-acid battery by working the lead-based alloy into a strip by the processing such as a rolling or an extrusion, followed by expanding the strip so as to form a grid shaped like a lattice.

As described previously, the lead-based alloy used in the present invention has a Ca content lower than that of the conventional lead-based alloy. Therefore, in the manufacture of the grid for the lead-acid battery, the grid formed directly by the casting method is soft and, thus, is likely to be deformed immediately after the manufacture. The tendency to be deformed easily can be improved by rapidly cooling the grid after the casting step by a water cooling or an air cooling. As a result, it is possible to prevent the grid from being deformed when the grid is handled.

In manufacturing the grid by casting a lead-based alloy containing Sn in an amount at least 12 times as large as that of Ca (Sn/Ca=12 or more) within the range of the composition described above, it is desirable to apply a heat treatment at 80 to 150° C. for 1 to 10 hours. It is desirable to carry out the heat treatment within 1,000 hours after manufacture of the grid by the casting of the lead-based alloy.

If the temperature for the heat treatment is less than 80° C., it is difficult to obtain sufficiently the effect produced by the heat treatment. On the other hand, if the temperature for the heat treatment exceeds 150° C., the aging tends to proceed excessively so as to lower the mechanical strength of the alloy. It is more desirable for the temperature for the heat treatment to fall within a range of between 90° C. and 140° C., furthermore desirably, between 90° C. and 120° C. If the time for the heat treatment is shorter than one hour, it is difficult to obtain a sufficient effect produced by the heat treatment. On the other hand, the effect produced by the heat treatment is not increased even if the time for the heat treatment exceeds 10 hours. Conversely, the excessively long heat treating time brings about an increased manufacturing cost. It is more desirable for the time for the heat treatment to fall within a range of between 1 hour and 5 hours.

It is desirable for the grid for the lead-acid battery of the present invention to have a surface roughness not less than 15 μm. Incidentally, the surface roughness (Rz) noted above implies a ten point average roughness specified in JIS B0601. It should be noted in this connection that the surface roughness is deeply related to the adhesion of the active material to the grid. If the surface roughness of the grid is less than 15 μm, it is difficult to achieve a sufficient improvement in the adhesion of the active material to the grid. It is more desirable for the surface roughness of the grid to fall within a range of between 15 μm and 45 μm.

It is possible to manufacture a grid for a lead-based battery having a prescribed surface roughness by, for example, coating a mold used in the casting step with a releasing agent formed of a dispersion prepared by dispersing a cork powder in water. Also, it is possible to impart a prescribed surface roughness to the grid by blowing a sand blast against the grid for a lead-acid battery prepared in advance.

Where the grid for a lead-acid battery of the present invention is shaped like a lattice, it is desirable for the effective diameter of the mesh of the lattice to be not less than twice the thickness of the grid, more desirably, to be not less than twice the thickness of the grid and to be not more than 10 times the thickness of the grid. Incidentally, the term "effective diameter" noted above implies the value obtained by dividing a value, which is four times the area of the polygon, by the circumferential length of the polygon. If the effective diameter of the grid used in the present invention is less than twice the thickness of the grid, it is difficult to obtain sufficiently the effects produced by defining the effective diameter, i.e., the effects of decreasing the weight of the grid and of suppressing the elongating deformation (growth) in the charge-discharge stage when the grid is incorporated in the battery.

It is appropriate to use the grid for a lead-acid battery of the present invention as a grid of the positive electrode. However, it is also possible to use the grid for a lead-acid battery of the present invention as a grid of a negative electrode.

(Lead-Acid Battery)

The lead-acid battery of the present invention is constructed to comprise a positive electrode including a grid made of a lead-based alloy comprising not less than 0.02% and less than 0.05% by weight of calcium, not less than 0.4% and not larger than 2.5% by weight of tin, not less than 0.005% and not more than 0.04% by weight of aluminum, not less than 0.002% and not more than 0.014% by weight of barium, and the balance of lead and unavoidable impurities.

As described previously, it is desirable for the lead-based alloy noted above to comprise further at least one additional element selected from the group consisting of silver (Ag) in an mount not less than 0.005% by weight and not more than 0.07% by weight, bismuth (Bi) in an amount not less than 0.01% by weight and not more than 0.10% by weight, and thallium (Tl) in an amount not less than 0.01% by weight and not more than 0.05% by weight.

In manufacturing the grid by casting a lead-based alloy containing Sn in an amount at least 12 times as large as that of Ca (Sn/Ca=12 or more) within the range of the composition described above, it is desirable to apply a heat treatment at 80 to 150° C. for 1 to 10 hours after the casting step.

It is desirable for the grid to have a surface roughness of at least 15 μm.

Where the grid is shaped like a lattice, it is desirable for the effective diameter of the mesh of the lattice to be at least twice the thickness of the grid, more desirably, to be at least twice the thickness of the grid and to be not more than 10 times the thickness of the grid.

The positive electrode is prepared by loading an active material such as $PbO_2$ in the grid.

The lead-acid battery of the present invention comprises a plate unit including a positive electrode, a negative electrode, and a separator interposed between the positive electrode and the negative electrode. The plate unit is incorporated in a battery case together with an electrolyte such as an aqueous solution of sulfuric acid.

Figure 2:
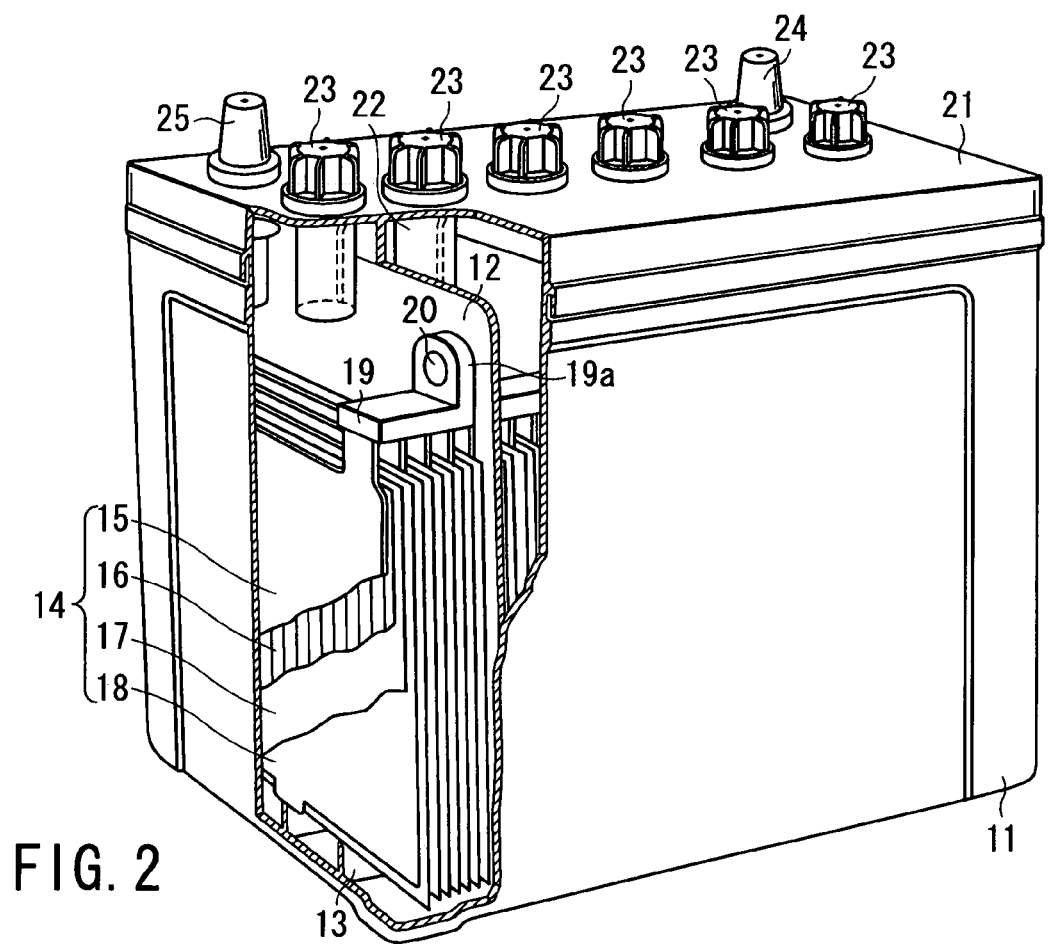
FIG. 2 is a cross-sectional view showing the construction of a lead-acid battery according to one embodiment of the present invention.

The specific construction of the lead-acid battery will now be described with reference to FIG. 2.

As shown in the drawing, the lead-acid battery of the present invention comprises a battery case 11 made of a synthetic resin such as polypropylene. The inner space of the battery case 11 is divided into, for example, six spaces by a plurality of partition plates 12 made of a synthetic resin. Negative electrode transmitting members 13 protruding upward from a plurality of plate-like members are arranged on the bottom surface within the battery case 11. A plurality of plate units 14, e.g., six plate units 14, are housed, respectively, within the six spaces partitioned from each other by the partition plates 12 within the battery case 11. The plate unit 14 comprises a negative electrode plate 15, a separator 16, a glass mat 17 and a positive electrode 17, which are laminated one upon the other in the order mentioned, and is housed in the battery case 11 such that the surface of the laminate structure noted above is parallel to the partition plate 13. The negative electrode plate 15 is prepared by loading an active material such as Pb in a grid made of, for example, Pd, a Pb—Sn alloy or a Pb—Ca—Sn—Al alloy.

A plurality of straps 19, e.g., six straps 19, each including a rising section 19a in the edge portion, are arranged above the group of the plate units 14. Each of the straps 19 is made of, for example, a Pb—Sb series alloy or a Pb—Sn series alloy. The straps 19 are arranged to permit the rising sections 19a to abut against the partition plates 12, and the rising sections 19a of the straps 19, which are positioned adjacent to each other with the partition plate 12 interposed therebetween, are connected and fixed to each other by a connecting section 20 made of, for example, Pb. In other words, the adjacent straps 19 are joined and connected to each other by the connecting section 20.

The upper edge of the negative electrode 15 included in each of the plate units 14 is connected to the strap 19. On the other hand, the lower edge of the positive electrode 18 included in each of the plate units 14 extends downward from the lower edges of the negative electrode plate 15, the separator 16 and the glass mat 17 so as to be connected to the plate-like section protruding downward from the negative electrode transmitting member 13.

A lid body 21 made of a synthetic resin such as polypropylene is mounted to the upper edge open section of the battery case 11. A plurality of electrolyte injecting cylinders 22, e.g., six injecting cylinders 22, made of Pb are allowed to hang within the battery case 11 such that the upper edges of the injecting cylinders 22 are engaged liquid tight with the lid body 21. An electrolyte such as an aqueous solution of sulfuric acid is injected into the battery case 11 through each of the injecting cylinders 22. A plurality of stopper bodies 23, e.g., six stopper bodies 23, are mounted by screw engagement to the upper edge portions of the electrolyte injecting cylinders 22, respectively. A negative electrode terminal 24 made of, for example, a Pb—Sb series alloy is mounted to the lid body 21 so as to be connected to the strap 19 through a lead wire (not shown). Also, a positive electrode terminal 25 made of, for example, a Pb—Sb series alloy is also mounted to the lid body 21 so as to be connected to the negative electrode transmitting member 13 through a lead wire (not shown).

Incidentally, it is acceptable to use the lead-based alloy described previously for manufacturing each of the parts of the lead-acid battery made of the Pb alloys described previously.

It should be noted that the mechanical strength of the lead-based alloy for a lead-acid battery of the present invention can be improved by adding Ba to the lead-based alloy containing Ca, Sn and Al. The effect produced by the Ba addition is already known to the art. However, the effect of improving the corrosion resistance is not recognized in the Ba addition. By contraries, the corrosion resistance of the alloy is markedly lowered if Ba is added in an amount exceeding a certain level.

Under the circumstances, it is important to allow the amounts of Sn and Al constituting the alloy components of the present invention to fall within prescribed ranges and to allow the amount of Ca to be not less than 0.02% by weight and to be less than 0.05% by weight and the amount of Ba to fall within a range of between 0.002% by weight and 0.014% by weight. In this case, both the corrosion resistance and the mechanical strength of the alloy can be synergetically improved so as to make it possible to obtain a lead-based alloy for a lead-acid battery exhibiting an improved resistance to the elongating deformation (resistance to the growth). It is considered reasonable to understand that, by defining the amounts of Ba and Ca in a manner to fall within the ranges described previously, Ba is allowed to act on the intermetallic compound typically represented by $(PbSn)_3Ca$ in the Pb—Sn—Ca series alloy so as to form a fine quaternary compound such as $(Pb, Sn)_3(Ca, Ba)$. As a result, the corrosion resistance and the mechanical strength of the alloy are considered to be improved simultaneously by the deposition dispersion effect.

As a matter of fact, it has been experimentally confirmed by the test described below that the lead-based alloy for a lead-acid battery of the present invention permits synergetically improving both the corrosion resistance and the mechanical strength.

[High Temperature Corrosion Test]

The aptitude for a lead-based alloy for a lead-acid battery was evaluated by measuring the corrosion resistance of the lead-based alloy of the present invention.

Figure 3:
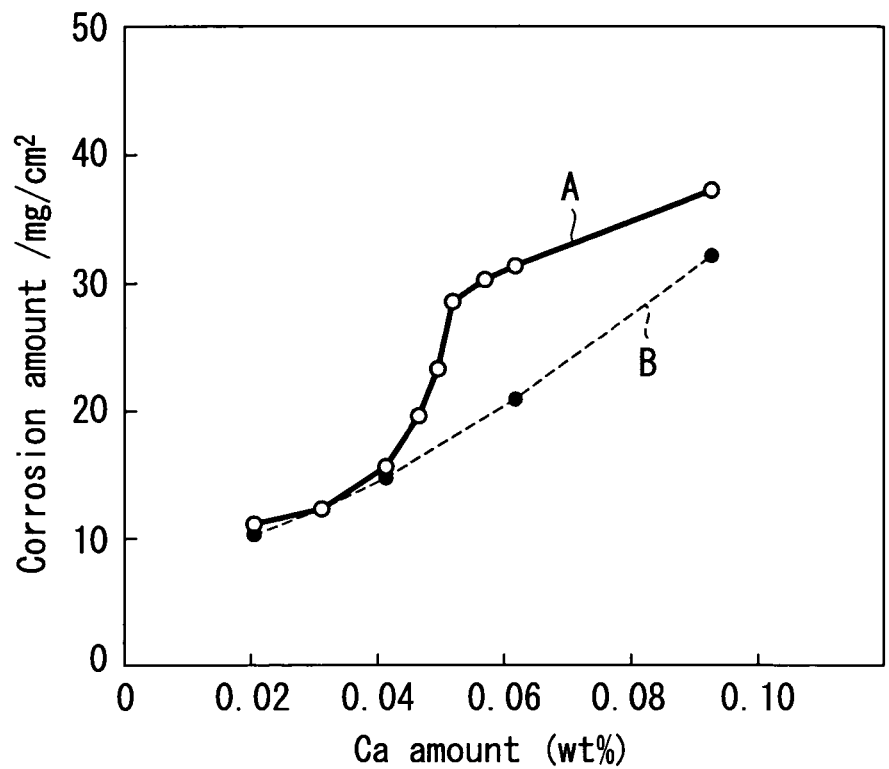
FIG. 3 is a graph showing the relationship between the Ca content of a lead-based alloy and the corrosion amount of the alloy.
Figure 4:
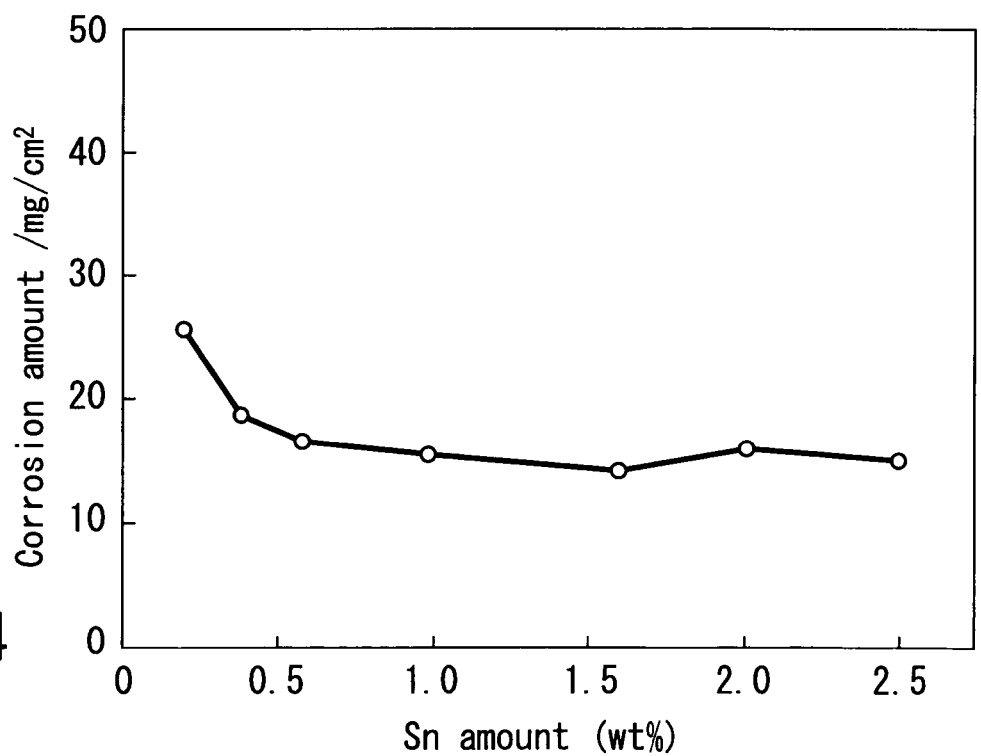
FIG. 4 is a graph showing the relationship between the Sn content of a lead-based alloy and the corrosion amount of the alloy.
Figure 5:
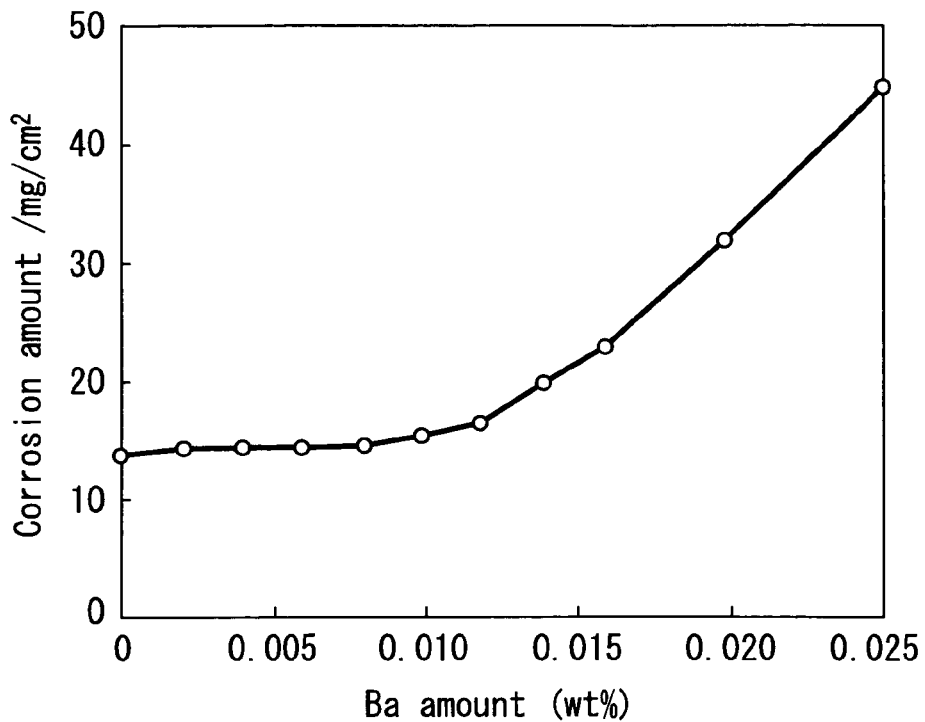
FIG. 5 is a graph showing the relationship between the Ba content of a lead-based alloy and the corrosion amount of the alloy.

Each of the samples tested was prepared by cutting out a part of the grid manufactured as a casted grid for a lead-acid battery. The sample thus prepared was subjected to an anodic oxidation for 720 hours within a dilute aqueous solution of sulfuric acid maintained at 60° C. under a constant potential of 1350 mV (vs. Hg/Hg$_2$SO$_4$). Then, the aptitude was evaluated by measuring the corrosion amount per unit area of the sample. FIGS. 3, 4 and 5 show the results.

FIG. 3 is a graph showing the relationship between the addition amount of Ca and the corrosion amount of the lead-based alloy. Curve A shown in FIG. 3 denotes the characteristics of the lead-based alloy comprising 1.00% by weight of Sn, 0.020% by weight of Al, 0.008% by weight of Ba and the balance of Pb and Ca, in which the amount of Ca was changed. On the other hand, curve B in FIG. 3 denotes the characteristics of the lead-based alloy comprising 1.00% by weight of Sn, 0.020% by weight of Al, and the balance of Pb and Ca, in which the amount of Ca was changed. It is clearly seen from FIG. 3 that the corrosion amount of the lead-based alloy containing Ba, which is represented by curve A, tends to be larger than that of the lead-based alloy that did not contain Ba, which is represented by curve B. It should be noted, however, that the Ba addition is effective for improving the mechanical strength of the lead-based alloy. In the lead-based alloys containing Ba, there is a large inflection point in the corrosion amount between the Ca content of 0.06% by weight and the Ca content of 0.04% by weight. The corrosion can be markedly lowered in the lead-based alloy containing Ca in an amount not more than 0.048% by weight, which is less than 0.05% by weight. Particularly, a prominently high effect of suppressing the corrosion can be recognized in the lead-based alloy containing Ca in an amount not more than 0.045% by weight. Also, it is recognized that the corrosion is moderately decreased in the lead-based alloy where the Ca content of the alloy is decreased from 0.04% by weight to 0.02% by weight. These are singular phenomena which cannot be recognized in the lead-based alloy that does not contain Ba.

FIG. 4 is a graph showing the relationship between the Sn addition amount and the corrosion amount of the lead-based alloy. The lead-based alloys used for the testing comprised 0.040% by weight of Ca, 0.020% by weight of Al, 0.008% by weight of Ba and the balance of Pb and Sn, in which the Sn content was changed. As shown in FIG. 4, the corrosion amount is increased in the lead-based alloy containing Sn in an amount less than 0.4% by weight.

FIG. 5 is a graph showing the relationship between the Ba addition amount and the corrosion amount of the lead-based alloy. The lead-based alloys used for the testing comprised Ca in an amount of 0.040% by weight, Sn in an amount of 1.00% by weight, Al in an amount of 0.020% by weight, and the balance of Pb and Ba, in which the Ba content was changed. As shown in FIG. 5, the corrosion amount is gradually increased with increase in the Ba content in the case where the Ba content exceeds 0.01% by weight. Where the Ba content exceeds 0.014% by weight, the corrosion amount of the lead-based alloy is rapidly increased. Incidentally, the experiment covered the cases where Ag, Bi and Tl were also added to the lead-based alloy, though these cases are not shown in the graph of FIG. 5. Where the lead-based alloy contained Ag in an amount of 0.005 to 0.07% by weight, Bi in an amount of 0.01 to 0.10% by weight, and Tl in an amount of 0.001 to 0.05% by weight, the corrosion amount was not appreciably increased, compared with the case where these elements were not added to the lead-based alloy. This was also the case with the situation that at least two kinds of these elements were used in combination.

[High Temperature Creep Test]

The samples for this test were also prepared by cutting out a part of the grid prepared as a casted grid for a lead-acid battery like the samples used for the corrosion test described above. The samples were subjected to a heat treatment at 100° C. for one hour so as to achieve an age-hardening, followed by cooling the age-hardened samples. The sample thus prepared was set in a testing apparatus and, after a load of 16.5 MPa was applied to the sample, the sample was heated to 100° C. to as to measure the time required for the rupture of the sample. FIGS. 6 to 11 show the results.

Figure 6:
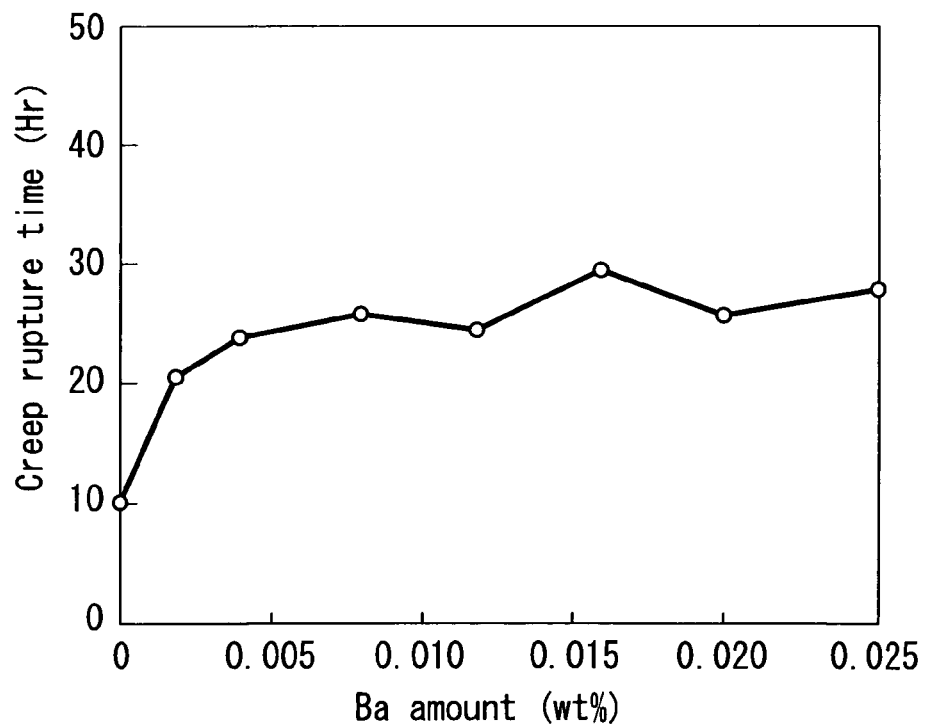
FIG. 6 is a graph showing the relationship between the Ba content of a lead-based alloy and the creep rupture time of the alloy.

FIG. 6 is a graph showing the relationship between the change in the Ba amount and the creep rupture time of the lead-based alloy. The lead-based alloy used for the testing comprised 0.040% by weight of Ca, 1.00% by weight of Sn, 0.020% by weight of Al, and the balance of Pb and Ba, in which the Ba content was changed. As shown in FIG. 6, no special phenomenon such as an improvement in the mechanical characteristics was recognized in the lead-based alloy having a Ba content not more than 0.02% by weight, which was referred to previously in conjunction with the prior art. The rupture time of the lead-based alloy is slightly shortened in accordance with decrease of the Ba addition amount from 0.025% by weight to 0.002% by weight. Where the Ba addition amount is decreased to 0.002% by weight or less, the rupture time of the lead-based alloy is rapidly shortened. This is the state that can be estimated generally.

Figure 7:
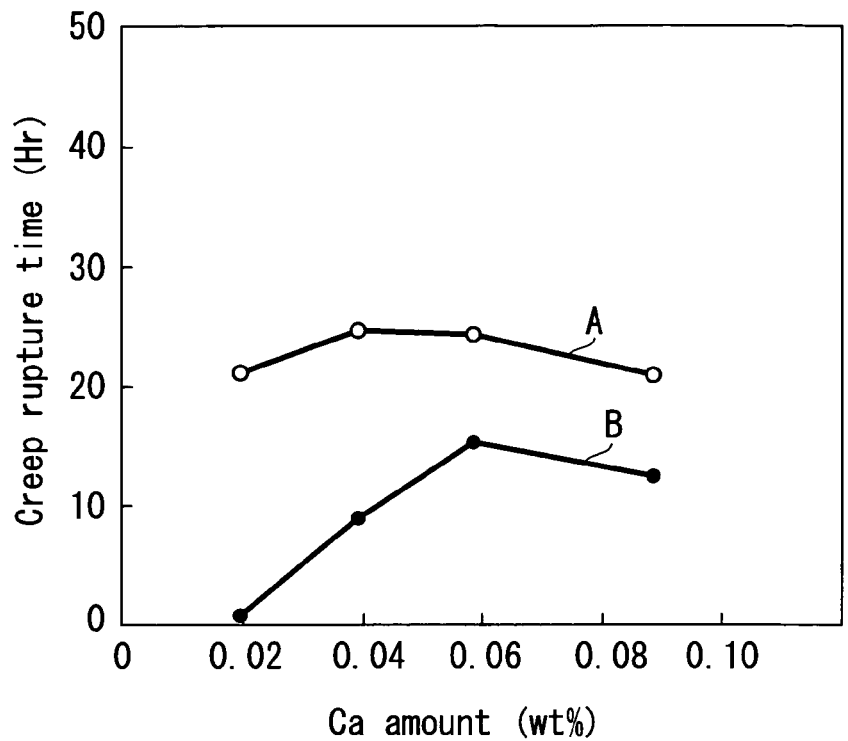
FIG. 7 is a graph showing the relationship between the Ca content of a lead-based alloy and the creep rupture time of the alloy.

FIG. 7 is a graph showing the relationship between the Ca addition amount and the creep rupture time of the lead-based alloy. Curve A shown in FIG. 7 covers the lead-based alloy comprising Sn in an amount of 1.00% by weight, Al in an amount of 0.020% by weight, Ba in an amount of 0.008% by weight, and the balance of Pb and Ca, in which the Ca content was changed. On the other hand, curve B in FIG. 7 covers the characteristics of the lead-based alloy comprising Sn in an amount of 1.00% by weight, Al in an amount of 0.020% by weight, and the balance of Pb and Ca, in which the Ca content was changed. As shown in FIG. 7, the creep rupture time of the lead-based alloy that does not contain Ba (curve B) is shorter as a whole than that of the lead-based alloy containing Ba (curve A). Particularly, if the Ca addition amount is less than 0.06% by weight, the rupture time of the lead-based alloy that does not contain Ba is rapidly shortened. On the other hand, an appreciable shortening in the rupture time with decrease in the Ca addition amount is not recognized in the lead-based alloy containing Ba.

Figure 8:
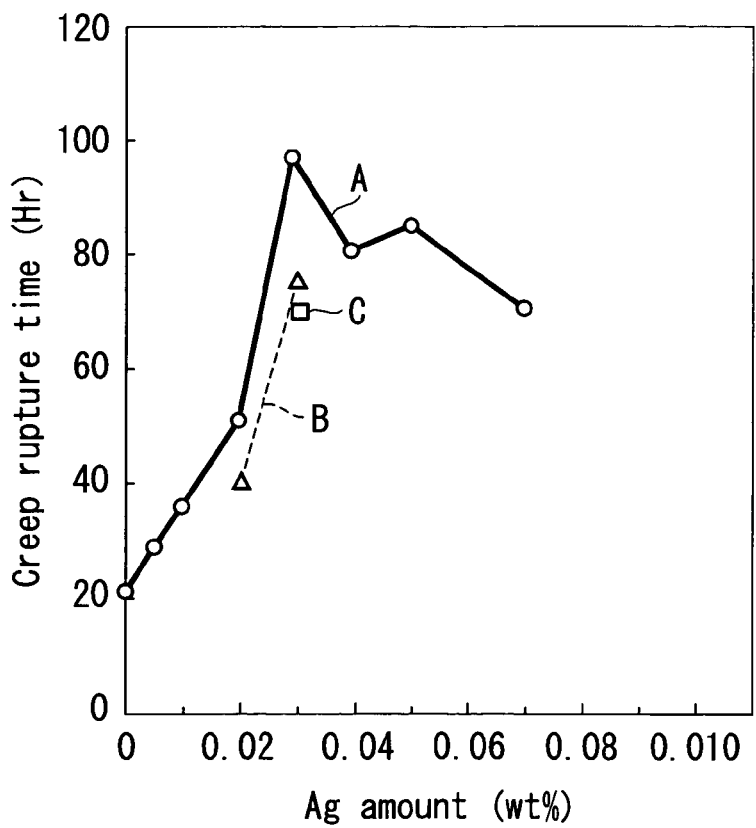
FIG. 8 is a graph showing the relationship between the Ag content of a lead-based alloy and the creep rupture time of the alloy.

FIG. 8 is a graph showing the relationship between the Ag addition amount and the creep rupture time of the lead-based alloy. Curve A shown in FIG. 8 denotes the characteristics of the lead-based alloy comprising Ca in an amount of 0.040% by weight, Sn in an amount of 0.60% by weight, Al in an amount of 0.020% by weight, Ba in an amount of 0.008% by weight, and the balance of Pb and Ag, in which the Ag addition amount was changed. Curve B in FIG. 8 denotes the characteristics of the lead-based alloy comprising Ca in an amount of 0.040% by weight, Sn in an amount of 0.80% by weight, Al in an amount of 0.020% by weight, Ba in an amount of 0.008% by weight, and the balance of Pb and Ag, in which the Ag addition amount was changed. Further, point C in FIG. 8 denotes the characteristics of the lead-based alloy comprising Ca in an amount of 0.040% by weight, Sn in an amount of 1.00% by weight, Al in an amount of 0.020% by weight, Ba in an amount of 0.008% by weight, Ag in an amount of 0.003% by weight, and the balance of Pb.

As apparent from FIG. 8, the Ag addition permits markedly improving the creep characteristics of the lead-based alloy. This tendency was left unchanged even if the Ca addition amount was slightly changed. Incidentally, the corrosion amount of the lead-based alloy was not particularly increased by the Ag addition, compared with the case where Ag was not added to the alloy, as far as the Ag addition amount fell within the range of the composition of the lead-based alloy specified in the present invention.

Figure 9:
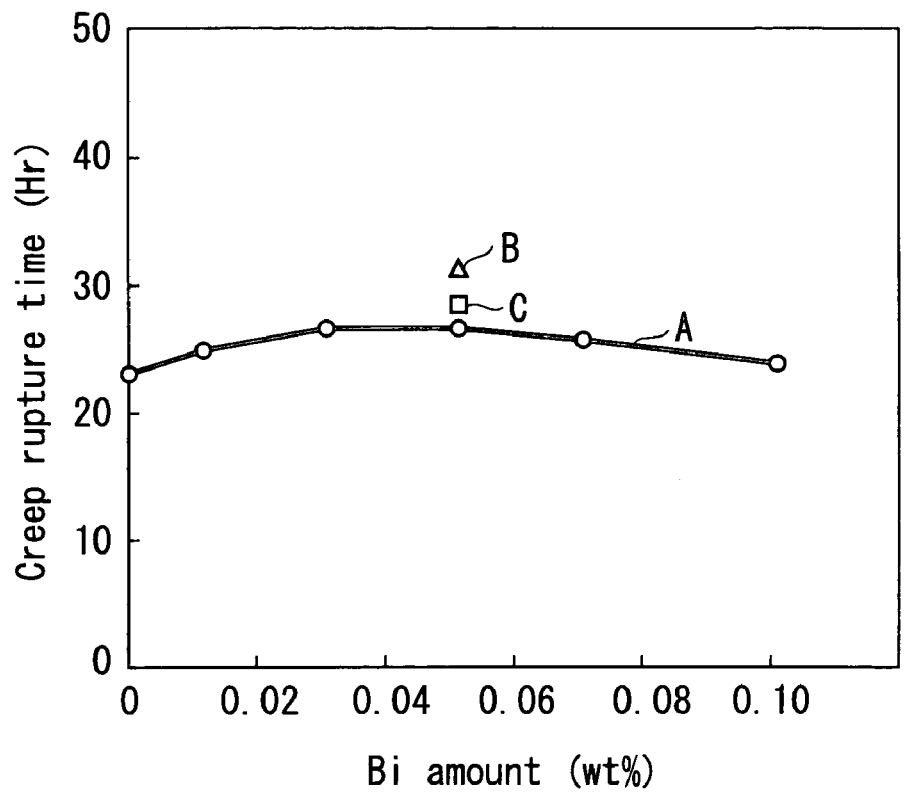
FIG. 9 is a graph showing the relationship between the Bi content of a lead-based alloy and the creep rupture time of the alloy.

FIG. 9 is a graph showing the relationship between the Bi addition amount and the creep rupture time of the lead-based alloy. Curve A shown in FIG. 9 denotes the characteristics of the lead-based alloy comprising Ca in an amount of 0.040% by weight, Sn in an amount of 1.60% by weight, Al in an amount of 0.020% by weight, Ba in an amount of 0.006% by weight, and the balance of Pb and Bi, in which the Bi addition amount was changed. Point B in FIG. 9 denotes the characteristics of the lead-based alloy comprising Ca in an amount of 0.040% by weight, Sn in an amount of 1.60% by weight, Al in an amount of 0.020% by weight, Ba in an amount of 0.008% by weight, Bi in an amount of 0.05% by weight and the balance of Pb. Further, point C in FIG. 9 denotes the characteristics of the lead-based alloy comprising Ca in an amount of 0.040% by weight, Sn in an amount of 1.60% by weight, Al in an amount of 0.020% by weight, Ba in an amount of 0.010% by weight, Bi in an amount of 0.005% by weight, and the balance of Pb.

As apparent from FIG. 9, the lead-based alloy having Bi added thereto permits improving the resistance to the creep rupture, though the degree of improvement achieved by the Bi addition is not so high as that achieved by the lead-based alloy having Ag added thereto. It should be noted in this connection that the lead-based alloy having Bi added thereto is cheaper than the lead-based alloy having Ag added thereto.

Figure 10:
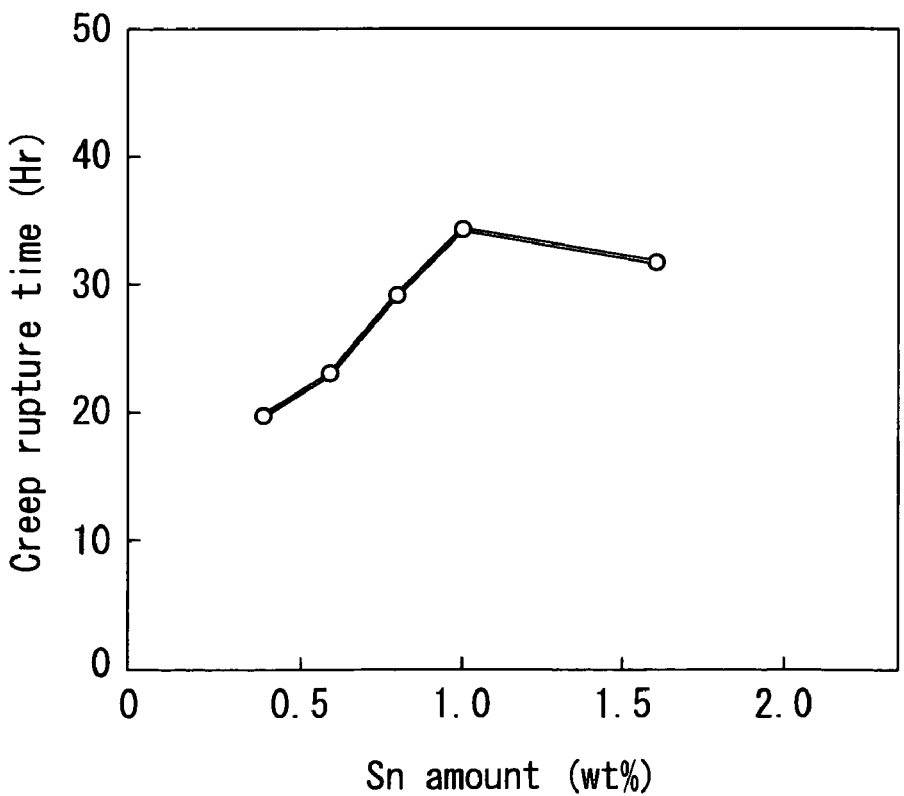
FIG. 10 is a graph showing the relationship between the Sn content of a lead-based alloy and the creep rupture time of the alloy.

FIG. 10 is a graph showing the relationship between the Sn addition amount and the creep rupture time of the lead-based alloy having Bi added thereto. The lead-based alloy used for the testing comprised Ca in an amount of 0.040% by weight, Al in an amount of 0.020% by weight, Ba in an amount of 0.008% by weight, Bi in an amount of 0.05% by weight, and the balance of Pb and Sn, in which the Sn content of the alloy was changed. As shown in FIG. 10, an improvement in the resistance to the creep rupture can be recognized even in the lead-based alloy having Bi added thereto in the case where the Sn content of the alloy is not less than 0.4% by weight.

Figure 11:
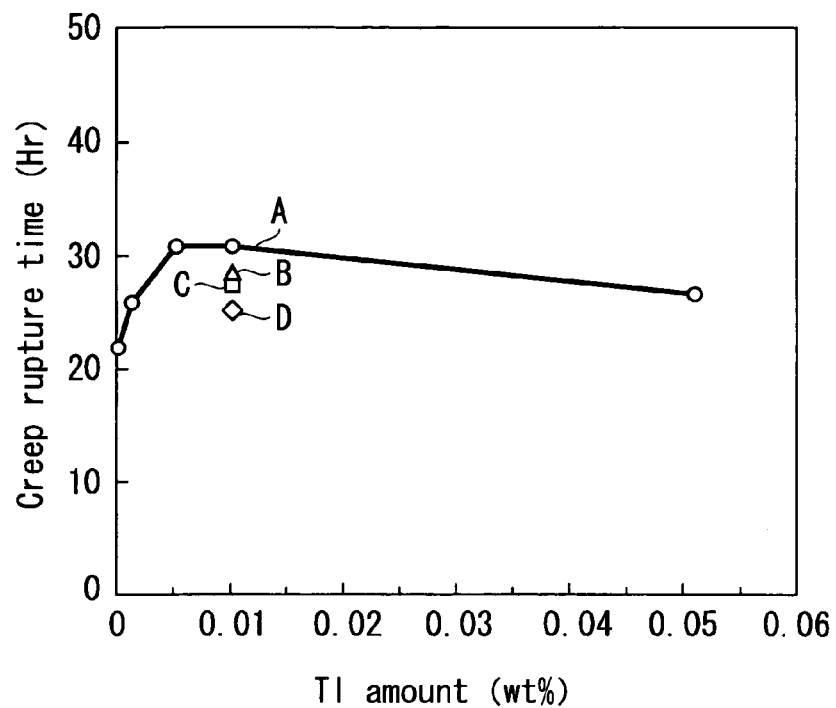
FIG. 11 is a graph showing the relationship between the Tl content of a lead-based alloy and the creep rupture time of the alloy.

FIG. 11 is a graph showing the relationship between the Tl addition amount and the creep rupture time of the lead-based alloy. Curve A shown in FIG. 11 denotes the characteristics of the lead-based alloy comprising Ca in an amount of 0.040% by weight, Sn in an amount of 1.60% by weight, Al in an amount of 0.020% by weight, Ba in an amount of 0.004% by weight, and the balance of Pb and Tl, in which the Tl addition amount was changed. Point B in FIG. 11 denotes the characteristics of the lead-based alloy comprising Ca in an amount of 0.040% by weight, Sn in an amount of 1.60% by weight, Al in an amount of 0.020% by weight, Ba in an amount of 0.006% by weight, Tl in an amount of 0.010% by weight, and the balance of Pb. Point C in FIG. 11 denotes the characteristics of the lead-based alloy comprising Ca in an amount of 0.040% by weight, Sn in an amount of 1.60% by weight, Al in an amount of 0.020% by weight, Ba in an amount of 0.008% by weight, Tl in an amount of 0.010% by weight, and the balance of Pb. Further, point d in FIG. 11 denotes the characteristics of the lead-based alloy comprising Ca in an amount of 0.040% by weight, Sn in an amount of 1.60% by weight, Al in an amount of 0.020% by weight, Ba in an amount of 0.010% by weight, Tl in an amount of 0.010% by weight, and the balance of Pb.

As apparent from FIG. 11, the lead-based alloy having Tl added thereto permits improving the resistance to the creep rupture, though the degree of improvement achieved by the Tl addition is not so high as that achieved by the lead-based alloy having Ag added thereto. It should be noted in this connection that the effect of improving the resistance to the creep rupture can be recognized even if the Tl addition amount is small, i.e., the Tl addition amount is about 0.001% by weight.

As described above, the lead-based alloy for a lead-acid battery of the present invention can be effectively used for preparation of a grid of a plate (particularly, a positive electrode plate) included in a lead-acid battery described herein later. Further, the lead-based alloy noted above can also be used for the preparation of, for example, the strap, the positive electrode terminal, the negative electrode terminal and the connecting member included in the lead-acid battery.

The grid for a lead-acid battery of the present invention is formed of a lead-based alloy comprising prescribed amounts of Sn, Al, Ca and Ba. Particularly, the Ca addition amount is not less than 0.02% by weight and less than 0.05% by weight, and the Ba addition amount is not less than 0.002% by weight and not more than 0.014% by weight. The particular composition of the lead-based alloy permits synergetically improving both the corrosion resistance and the mechanical strength of the grid for a lead-acid battery of the present invention. As a result, it is possible to improve the resistance to the elongating deformation (resistance to growth) of the grid during the charge-discharge operation of the lead-acid battery having the positive electrode including the particular grid incorporated therein. It follows that it is possible to prolong the life of the lead-acid battery.

Particularly, in the case where the Sn content of the lead-based alloy used for preparing a grid by the casting is at least 12 times as high as that of the Ca content, the Sn atoms are segregated in the grain boundaries so as to corrode the grid. In the present invention, however, a heat treatment is applied to the grid after the casting step at 80° C. to 150° C. for 1 to 10 hours. As a result, it is possible to prevent the corrosion of the grid caused by the segregation of the Sn atoms in the grain boundaries noted above. The heat treatment noted above also permits increasing the hardness of the grid so as to improve the handling properties of the grid.

To be more specific, where the Sn/Ca ratio in the lead-based alloy constituting the grid for a lead-acid battery is not less than 12, an excessively large number of tin atoms are present relative to the intermetallic compounds formed (mainly $Sn_3Ca$) so as to be segregated in the grain boundaries. As a result, the corrosion in the form of the grain boundary corrosion tends to be brought about. In the present invention however, even in the case where the lead-based alloy used for preparing a grid has a relatively high Sn content because the Ca content of the alloy is low, the grain boundary is small in the texture of the alloy, with the result that it is possible to suppress the corrosion of the grid. It should be noted, however, that, in the case where the grain boundary corrosion has proceeded to some extent, it is expected that the grain boundary will be corroded and eliminated so as to increase the pH value inside the alloy, thereby promoting the corrosion rate. In the grid under the particular state, the corrosion tends to proceed in the shape of the nest of the ant along the grain boundaries having the Sn atoms segregated thereon.

Under the circumstances, a heat treatment is applied in the present invention to the grid manufactured from the lead-based alloy so as to diffuse the segregated tin atoms and to disperse uniformly the tin atoms. As a result, it is possible to prevent the corrosion of the grid caused by the segregation of the tin atoms in the grain boundaries. Also, when it comes to the singular mechanical characteristics of the lead-based alloy constituting the grid used in the present invention, the ordinary intermetallic compound of $Sn_3Ca$ is dispersed uniformly and is dispersed in the form of finer particles under the function produced by Ba. It follows that the heat treatment noted above permits the lead-based alloy of the present invention to exhibit a sufficiently high mechanical strength and a sufficient resistance to the creep rupture in spite of the situation that the Ca addition amount is small in the lead-based alloy of the present invention.

The grid for a lead-acid battery of the present invention has a surface roughness not less than 15 μm. As a result, the adhesion strength of the paste layer of the active material formed on the grid surface to the grid surface can be increased.

To be more specific, in the grid for a lead-acid battery of the present invention, the adhesion strength between the paste layer of the active material and the grid surface is produced by the mutual function between the composition of the lead-based alloy and the surface roughness of the grid. The grid having a large surface roughness permits increasing the adhesion strength between the grid surface and the paste layer of the active material because of the mechanical coupling achieved by an anchoring effect. It should be noted, however, that, in order to improve sufficiently the adhesion strength between the paste layer of the active material and the grid surface, it is insufficient to define simply the surface roughness of the grid. In other words, a chemical coupling is also required for sufficiently improving the adhesion strength in question.

In the grid for a lead-acid battery of the present invention, the chemical coupling of the grid with the active material of the grid, which is derived from the composition of the lead-based alloy, plays an important role that is more significant than that played by the anchoring effect derived from the surface roughness of the grid. In general, in the grid loaded with a paste of the active material, the pH value on the surface is increased in the curing process during which the grid is put under an environment of a high temperature and a high humidity, with the result that lead ions are generated. Under the circumstances, if the surface roughness (Rz) is increased to exceed 15 μm, the pH value in the valley portion in the cross-sectional curve on the surface of the grid loaded with a paste of the active material is rendered further higher than the pH value in the ridge portion. As a result, the dissolution of the grid surface is further promoted. It is considered reasonable to understand that, if the surface roughness (Rz) is increased to exceed 15 μm, the water content in the valley portion is rendered higher than that in the ridge portion so as to increase the pH value in the valley portion as pointed out above. As a result, the dissolved lead ions and the active material serve to form an appropriate corrosion layer on the surface of the grid so as to improve the adhesion strength in question and the discharge characteristics under a large current.

On the other hand, where the lead-based alloy used for forming the grid contains calcium in an amount not less than 0.05% by weight, the corrosion layer formed between the layer of the active material and the grid surface is rendered porous. As a result, the thickness of the grid is markedly increased if the charge-discharge operation is carried out repeatedly so as to give rise to the crack generation. It follows that the electrical resistance between the grid and the active material layer is increased. In the present invention, however, the lead-based alloy used for preparing the grid contains calcium in an amount less than 0.05% by weight. Since the calcium content of the lead-based alloy is less than 0.05% by weight, it is possible to densify the corrosion layer in the present invention so as to prevent the deterioration of the battery caused by the repetition of the charge-discharge operation.

As described above, if the grid prepared from a lead-based alloy containing calcium in an amount not less than 0.05% by weight has a surface roughness (Rz) not less than 15 μm, developed is a porous corrosion layer. The development of the porous corrosion layer results in failure to improve the adhesion strength between the paste layer of the active material and the grid surface. In addition, the discharge characteristics under a high current are lowered. In the present invention, however, the grid is formed of a lead-based alloy having a calcium content less than 0.05% by weight. In this case, a dense corrosion layer can be formed between the active material layer and the grid surface by allowing the grid to have a surface roughness (Rz) not less than 15 μm. It follows that a satisfactory adhesion strength and a low electrical resistance can be provided in the present invention between the grid and the active material layer. In addition, it is possible to improve the discharge characteristics under a high current.

Further, where the grid for a lead-acid battery of the present invention is shaped like a lattice, it is possible to decrease the weight and suppress the elongation of the grid, if the effective diameter of the mesh of the grid is at least two times as much as the thickness of the grid.

To be more specific, it is considered reasonable to understand that the elongation of the plate included in the lead-acid battery is brought about by the change in volume of the corrosion product on the surface of the grid, i.e., the change in volume which is generated in accordance with progress of the charge-discharge operation, and that the grid itself is elongated by the creep phenomenon produced by the stress accompanying the change in volume of the corrosion product noted above so as to lead to the elongation of the plate included in the lead-acid battery. The corrosion resistance of the grid itself is greatly affected by the properties of the corrosion product formed on the surface of the grid. A porous corrosion product permits promoting the supply of a liquid electrolyte into the plate including the grid, with the result that the charge-discharge is likely to take place easily so as to bring about a prominent change in the volume of the corrosion product. It follows that a vicious circle arises such that a newly formed surface appears on the surface of the grid so as to further promote the corrosion.

Under the circumstances, the lead-based alloy used for preparing a grid for a lead-acid battery of the present invention is prepared by adding various elements such as Ca, Sn, Al and Ba to lead at prescribed ratios. In the present invention, the corrosion product noted above is densified under the functions produced by the various elements added to lead so as to suppress the permeation of the liquid electrolyte into the grid. As a result, the charge-discharge operation can be achieved appropriately, and the creep phenomenon is unlikely to take place so as to suppress the elongation of the grid itself. It follows that a stable state can be maintained. What should be noted is that a grid for a lead-acid battery, which is unlikely to be elongated and which can be made lighter, can be obtained by coarsening the mesh of the lattice and by making the lattice fine.

The grid for the positive electrode included in a lead-acid battery of the present invention is formed of a lead-based alloy comprising prescribed amounts of Sn, Al, Ca and Ba. Particularly, the Ca addition amount is not less than 0.02% by weight and less than 0.05% by weight, and the Ba addition amount is not less than 0.002% by weight and not more than 0.014% by weight. The particular composition of the lead-based alloy permits synergetically improving both the corrosion resistance and the mechanical strength of the grid for the positive electrode included in the lead-acid battery of the present invention. As a result, it is possible to improve the resistance to the elongating deformation (resistance to growth) of the grid during the charge-discharge operation of the lead-acid battery having the positive electrode including the particular grid incorporated therein. It follows that it is possible to prolong the life of the lead-acid battery.

It should also be noted that, in the case where the Sn content of the lead-based alloy used for preparing a grid by the casting is at least 12 times as high as that of the Ca content, the Sn atoms are segregated in the grain boundaries so as to corrode the grid. In the present invention, however, a heat treatment is applied to the grid after the casting step at 80° C. to 150° C. for 1 to 10 hours. As a result, it is possible to prevent the corrosion of the grid caused by the segregation of the Sn atoms in the grain boundaries noted above. As a result, the lead-acid battery having a positive electrode including the particular grid incorporated therein permits improving the resistance to the elongating deformation (resistance to the growth) of the grid during the charge-discharge operation so as to further prolong the life of the lead-acid battery.

Further, the grid of the positive electrode included in the lead-acid battery of the present invention is formed of the lead-based alloy having a calcium content less than 0.05% by weight and has a surface roughness (Rz) not less than 15 μm. As a result, it is possible to achieve a good adhesion strength and a low electrical resistance between the paste layer of the active material and the grid. It follows that the lead-acid battery having the positive electrode including the particular grid incorporated therein permits improving the discharge characteristics under a high current.

Still further, where the grid for the positive electrode is shaped like a lattice, the effective diameter of the mesh of the lattice is made at least two times as much as the thickness of the grid so as to decrease the weight and suppress the elongation of the grid. It follows that the lead-acid battery having the positive electrode including the particular grid incorporated therein makes it possible to decrease the weight and to suppress the elongation of the lead-acid battery so as to prolong the life of the battery.

Preferred Examples of the present invention will now be described in detail. Needless to say, the technical scope of the present invention is not limited at all by the following Examples.

Examples 1 to 7 and Comparative Examples 1 to 5

Twelve pairs of grids each having a lug portion were manufactured by a casting method using a book mold by using 12 kinds of lead-based alloys having the compositions shown in Table 1. Incidentally, the component other than the components shown in Table 1 consisted essentially of Pb. The casting was carried out at a rate of 15 grids per minute. The grid for each of Examples 1 to 7 among the paired grids thus obtained was soft and easy to be deformed, compared with the grid for each of Comparative Examples 1, 2, 4 and 5 having a high Ca content. Therefore, the grid for each of Examples 1 to 7 was cooled by blowing a cool air immediately after the casting so as to remove the undesired portion. Then, the grid was subjected to a heat treatment at 100° C. for one hour so as to achieve an age-hardening.

In the next step, the paired grids were loaded by the known method with a positive electrode paste prepared by kneading a mixture consisting of a PbO powder and an aqueous solution of sulfuric acid. In this step, deformation was not observed in the grid for each of Examples 1 to 7 so as to make it possible to carry out the loading of the positive electrode paste as in the grid for each of Comparative Examples 1, 2, 4 and 5 having a high Ca content. Then, the paired grids loaded with the positive electrode paste were subjected to a curing treatment for 24 hours under an atmosphere having a temperature of 40° C. and a humidity of 95%, followed by drying the plates, cutting the dried plates with a cutter and, then, separating the paired plates so as to obtain cured positive plates.

In the cured positive plate thus obtained, a dense corrosion layer was found to have been formed at the interface between the grid and the active material layer. Also, the corrosion layer thus formed was found to be thinner than the corrosion layer formed in the cured positive plate including the grid for Comparative Examples 1, 2, 4, 5 having a high Ca content. Further, in the cured positive plate thus obtained, the active material was found to have been adhered strongly to the grid and, thus, the active material did not drop during the handling as in the cured positive plate for Comparative Examples 1 to 5.

In the next step, a plate unit was prepared by combining the cured positive plate thus obtained with a cured negative plate with a polyethylene separator interposed therebetween. The cured negative plate noted above was prepared by loading by the known method a grid made of Pb—Ca—Sn with a negative electrode paste prepared by kneading a mixture consisting of a PbO powder, an additive such as lignin and an aqueous solution of sulfuric acid. The plate unit thus prepared was housed in a battery case, and a lid body was mounted to the battery case. Further, a dilute aqueous solution of sulfuric acid having a specific gravity of 1.25 was poured into the battery case so as to apply a formation, thereby manufacturing 12 kinds of liquid type lead-acid batteries of size JIS D23 each having a 5-hour battery capacity of 40 Ah. The interface between the grid and the active material of the positive electrode plate after the formation was observed. A thin and dense corrosion layer was found to have been formed on each of the grids made of the lead-based alloys for Examples 1 to 7. This tendency was left unchanged even during and after the life test.

The life (the number of charge-discharge cycles) of the lead-acid battery obtained in each of Examples 1 to 7 and Comparative Examples 1 to 5 was evaluated under the accelerating condition specified in JIS D 5301 that the temperature for the life test was elevated from 40° C. to 75° C. Table 1 also shows the results.

TABLE 1

|  | Alloy composition (% by weight) | | | | | Life (the number of charge-discharge cycles) |
| --- | --- | --- | --- | --- | --- | --- |
|  | Ca | Sn | Al | Ba | Ag/Bi/Tl |  |
| Example 1 | 0.020 | 1.00 | 0.020 | 0.008 | — | more than 5000 |
| Example 2 | 0.040 | 1.00 | 0.020 | 0.008 | — | more than 5000 |
| Example 3 | 0.045 | 1.00 | 0.020 | 0.008 | — | more than 5000 |
| Example 4 | 0.048 | 1.00 | 0.020 | 0.008 | — | more than 5000 |
| Example 5 | 0.040 | 0.60 | 0.020 | 0.008 | 0.03 Ag | more than 5000 |
| Example 6 | 0.040 | 0.80 | 0.020 | 0.008 | 0.05 Bi | more than 5000 |
| Example 7 | 0.040 | 1.60 | 0.020 | 0.004 | 0.01 Tl | more than 5000 |
| Comparative example 1 | 0.050 | 1.00 | 0.020 | 0.008 | — | 3500 |
| Comparative example 2 | 0.090 | 1.00 | 0.020 | 0.008 | — | 2500 |
| Comparative example 3 | 0.040 | 0.80 | 0.020 | — | 0.02 Ag | 3000 |
| Comparative example 4 | 0.060 | 1.10 | 0.020 | — | 0.02 Ag | 2500 |
| Comparative example 5 | 0.060 | 1.10 | 0.020 | — | — | 2000 |

As apparent from Table 1, the lead-acid battery comprising the positive electrode plate including the grid made of the lead-based alloy for each of Examples 1 to 7 exhibited at least 5000 charge-discharge cycles, supporting that the particular lead-acid battery exhibits a long life even under the situation under which an overcharge is repeated under high temperatures. On the other hand, the number of charge-discharge cycles achieved by the lead-acid battery comprising the positive electrode plate including the grid made of the lead-based alloy for each of Comparative Examples 1 to 5 was found to be 3500 to 2000.

Examples 8, 9 and Comparative Examples 6, 7

Four kinds of alloy strips each having a thickness of 0.9 mm were prepared by applying a rolling to a ingot made of the four kinds of the lead-based alloys having the compositions as shown in Table 2. Incidentally, the alloy component other than the components shown in Table 2 consisted essentially of Pb. These alloy strips were subjected to an expanding treatment so as to prepare expanded grids. Each of these expanded grids was loaded by the known method with a positive electrode paste prepared by kneading a mixture consisting of a PbO powder and an aqueous solution of sulfuric acid, followed by subjecting the grid to a curing treatment for 24 hours under an atmosphere having a temperature of 40° C. and a humidity of 95%. Then, the cured grid was dried so as to obtain a cured positive plate. Naturally, four kinds of the cured positive plates were prepared.

In the next step, a plate unit was prepared by combining the cured positive plate thus obtained with a cured negative plate with a retainer mat separator made of fine glass fibers interposed therebetween. The cured negative plate noted above was prepared by loading by the known method a grid made of Pb—Ca—Sn with a negative electrode paste prepared by kneading a mixture consisting of a PbO powder, an additive such as lignin and an aqueous solution of sulfuric acid. The plate unit thus prepared was housed in a battery case, and a lid body was mounted to the battery case. Further, a dilute aqueous solution of sulfuric acid having a specific gravity of 1.200 was poured into the battery case so as to apply a formation, thereby manufacturing four kinds of 36V seal type lead-acid batteries of size JIS D26 each having a 5-hour battery capacity of 20 Ah.

The life (the number of charge-discharge cycles) of the lead-acid battery obtained in each of Examples 8, 9 and Comparative Examples 6, 7 was evaluated under the accelerating condition of 60° C. in a test simulating the use pattern in a hybrid vehicle. Table 2 also shows the results. In the use pattern noted above, the charge-discharge operations were repeated under the conditions that the discharge was performed for 30 seconds with a current of 3 CA under 80% of SOC (state of charge), followed by further performing the discharge for 1 second with a current of 15 CA and, then, the charging was performed under the conditions of a constant voltage, a constant current and the maximum current of 3 CA. Incidentally, the life of the lead-acid battery was regarded as having expired when the battery voltage after the discharge for one second with a current of 15 CA was reduced to 7.2 V or less.

TABLE 2

| | Alloy composition (% by weight) | | | | Life (the number of charge-discharge cycles) |
|---|---|---|---|---|---|
| | Ca | Sn | Al | Ba | |
| Example 8 | 0.040 | 1.00 | 0.020 | 0.008 | more than 80000 |
| Example 9 | 0.045 | 1.60 | 0.020 | 0.008 | more than 80000 |
| Comparative example 6 | 0.055 | 1.00 | 0.020 | 0.008 | 45000 |
| Comparative example 7 | 0.060 | 1.10 | 0.020 | — | 35000 |

As apparent from Table 2, the lead-acid battery comprising the positive electrode plate including the grid made of the lead-based alloy for each of Examples 8 and 9 exhibited at least 80,000 charge-discharge cycles, supporting that the particular lead-acid battery exhibits a long life even under the situation under which an overcharge is repeated under high temperatures. On the other hand, the number of charge-discharge cycles achieved by the lead-acid battery comprising the positive electrode plate including the grid made of the lead-based alloy for each of Comparative Examples 6 and 7 was found to be 35,000 to 45,000.

Examples 10 to 13

Casted grids were manufactured by using a book mold by using a lead-based alloy comprising Ca in an amount of 0.040% by weight, Sn in an amount of 1.00% by weight, Al in an amount of 0.020% by weight, Ba in an amount of 0.008% by weight, and the balance of Pb. The casting was carried out at a rate of 15 grids per minute. The grids thus obtained were subjected to a heat treatment at various temperatures for 1 hour (Example 10), for 1.5 hours (Example 11), for 3 hours (Example 12), and for 10 hours (Example 13).

Comparative Example 8

Casted grids were manufactured by using a book mold by using a lead-based alloy comprising Ca in an amount of 0.060% by weight, Sn in an amount of 1.00% by weight, Al in an amount of 0.020% by weight, and the balance of Pb. The casting was carried out at a rate of 15 grids per minute. The grids thus obtained were subjected to a heat treatment at various temperatures for 3 hours.

Figure 12:
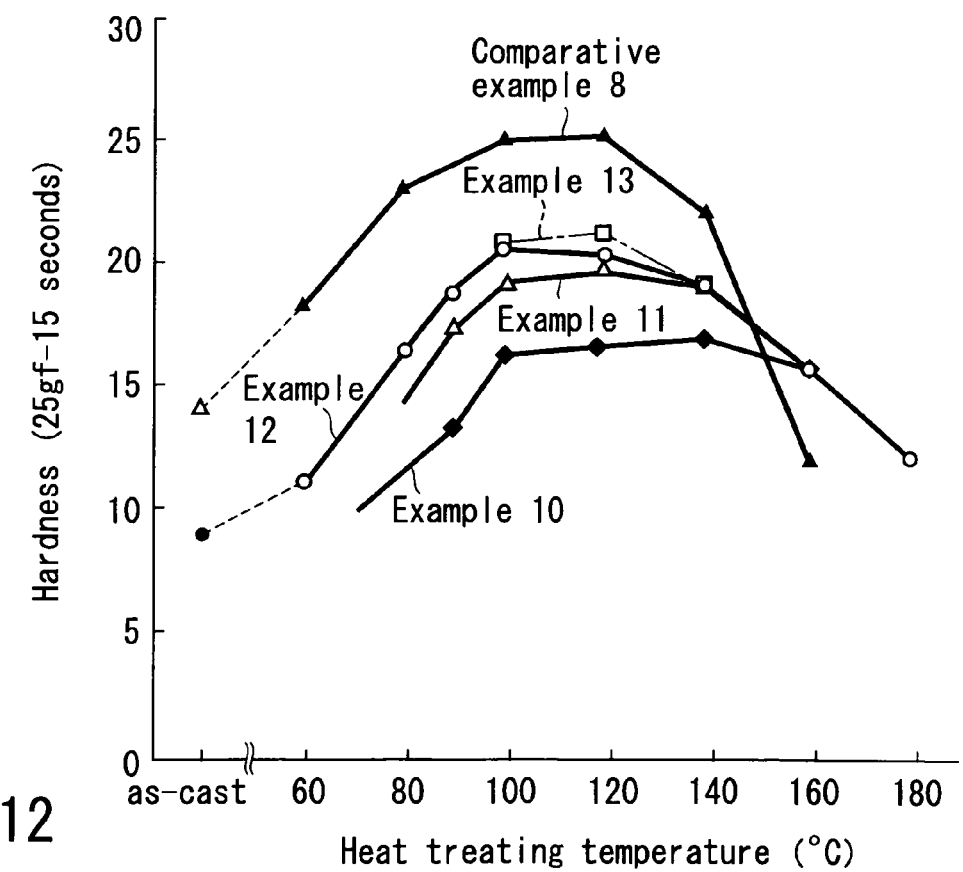
FIG. 12 is a graph showing the relationship between the heat treating temperature of a grid and the hardness of the grid in respect of Examples 10 to 13 and Comparative Example 8.

The hardness of the grid after the heat treatment for each of Examples 10 to 13 and Comparative Example 8 was measured by using a Vickers indenter under a load of 25 gf and a load retaining time of 15 seconds. FIG. 12 shows the results.

Figure 13:
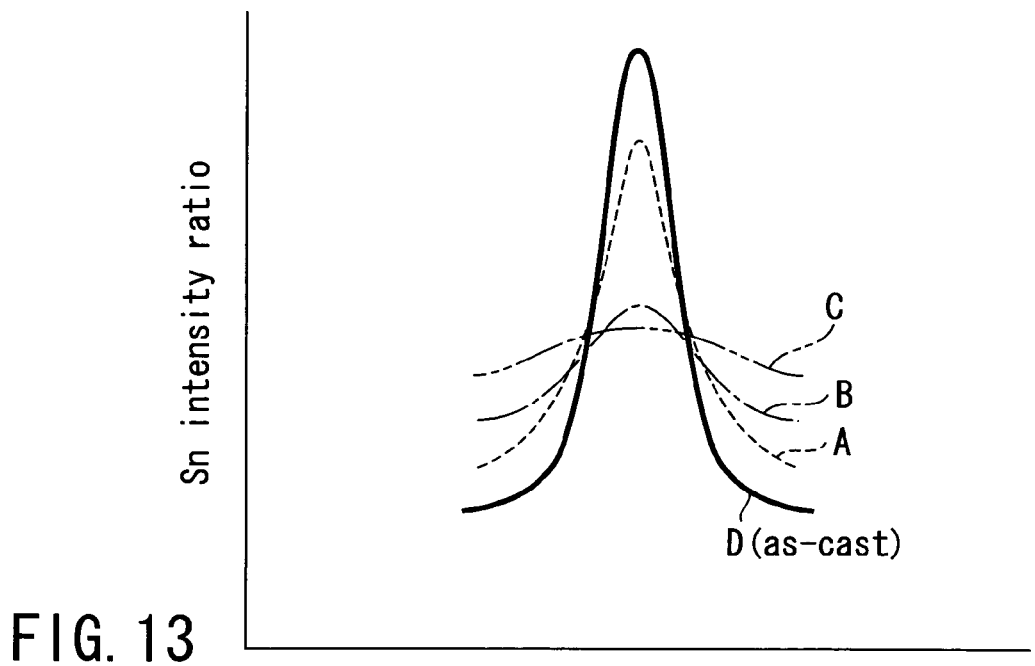
FIG. 13 is a graph showing the tin distribution in the prescribed grain boundaries of the grid which was subjected to a heat treatment at 60° C., 120° C. and 180° C. in Example 11 of the present invention.

Also, the tin distribution in a specified grain boundary was examined with an EPMA in respect of the grids having the heat treatment applied thereto in Example 12 at 60° C., 120° C. and 180° C., respectively. FIG. 13 shows the results. Incidentally, curve A in FIG. 13 denotes the tin distribution at the grain boundary, covering the grid having the heat treatment applied thereto for 3 hours at 60° C. Curve B in FIG. 13 denotes the tin distribution at the grain boundary, covering the grid having the heat treatment applied thereto for 3 hours at 120° C. Curve C in FIG. 13 denotes the tin distribution at the grain boundary, covering the grid having the heat treatment applied thereto for 3 hours at 180° C. Further, Curve D in FIG. 13 denotes the tin distribution at the grain boundary, covering the lead-based alloy as cast used in Example 12.

As apparent from FIG. 12, it is important to apply a heat treatment to the grid made of a lead-based alloy of the composition for each of Examples 10 to 13, the alloy having a Sn/Ca weight ratio of at least 12 and containing a prescribed amount of Ba, for 1 to 10 hours under the temperatures falling within a range of between 80° C. and 150° C. In the case of applying the particular heat treatment, it is possible to obtain a grid having a hardness close to the hardness after the heat treatment of a grid made of the lead-based alloy of the composition for each of Comparative Example 8, the alloy having a Ca content not less than 0.05% by weight (i.e., 0.06% by weight) and not containing Ba. It follows that it is possible to allow the grid made of the lead-based alloys of the compositions for Examples 10 to 13, the alloy having a Sn/Ca weight ratio of at least 12 and containing a prescribed amount of Ba, to exhibit the handling properties fully comparable with that of the grid made of the conventional lead-based alloy, if a heat treatment is applied to the grids for the Examples of the present invention under the conditions given above.

Also, FIG. 13 clearly supports that it is possible to suppress markedly the segregation of Sn at the grain boundaries in the grid made of the lead-based alloy of the composition for Example 12, the alloy having a Sn/Ca weight ratio of at least 12 and containing a prescribed amount of Ba, compared with the grid made of a lead-based alloy of the same composition as cast, which was subjected to a heat treatment at 120° C. for 3 hours falling within the temperature range of between 80° C. and 150° C. and the time range for the heat treatment of between 1 hour and 10 hours specified in the present invention, and with the grid having a heat treatment applied thereto at 60° C. for 3 hours. In other words, FIG. 13 supports that Sn is diffused and dispersed uniformly in the grid after the heat treatment specified in the present invention. Incidentally, FIG. 13 also supports that the segregation of Sn at the grain boundaries can be further lowered in the grid having a heat treatment applied thereto at 180° C. for 3 hours. It should be noted, however, that the grid having a heat treatment applied thereto at 180° C. for 3 hours tends to have a lowered hardness, as apparent from FIG. 12.

Examples 14 to 16

Pairs of grids each having a lug portion were manufactured by a casting method using a book mold by using a lead-based alloy containing Ca in an amount of 0.040% by weight, Sn in an amount of 1.00% by weight, Al in an amount of 0.020% by weight, Ba in an amount of 0.008% by weight, and the balance of Pb. The casting was carried out at a rate of 15 grids per minute. The grid as cast was cooled by blowing a cool air so as to remove the undesired portion. Then, the paired grids were subjected to a heat treatment at 60° C. and 180° C., respectively, for 3 hours.

In the next step, the paired grids were loaded by the known method with a positive electrode paste prepared by kneading a mixture consisting of a PbO powder and a dilute aqueous solution of sulfuric acid. Then, the paired grids loaded with the positive electrode paste were subjected to a curing treatment for 24 hours under an atmosphere having a temperature of 40° C. and a humidity of 95%, followed by drying the plates, cutting the dried plates with a cutter and, then, separating the paired plates so as to obtain three kinds of cured positive plates.

In the next step, a plate unit was prepared by combining the cured positive plate thus obtained with a cured negative plate with a polyethylene separator interposed therebetween. The cured negative plate noted above was prepared by loading by the known method a grid made of Pb—Ca—Sn with a negative electrode paste prepared by kneading a mixture consisting of a PbO powder, an additive such as lignin and an aqueous solution of sulfuric acid. The plate unit thus prepared was housed in a battery case, and a lid body was mounted to the battery case. Further, a dilute aqueous solution of sulfuric acid having a specific gravity of 1.250 was poured into the battery case so as to apply a formation, thereby manufacturing three kinds of liquid type lead-acid batteries of size JIS D23 each having a 5-hour battery capacity of 40 Ah.

Comparative Examples 9 to 11

Pairs of grids each having a lug portion were manufactured by a casting method using a book mold by using a lead-based alloy containing Ca in an amount of 0.060% by weight, Sn in an amount of 1.00% by weight, Al in an amount of 0.020% by weight, and the balance of Pb. The casting was carried out at a rate of 15 grids per minute. The undesired portion was removed from the grid as cast. Then, the paired grids were subjected to a heat treatment at 60° C., 120° C. and 180° C., respectively, for 3 hours.

In the next step, the paired grids after the heat treatment were loaded by the known method with a positive electrode paste prepared by kneading a mixture consisting of a PbO powder and an aqueous solution of sulfuric acid. Then, the paired grids loaded with the positive electrode paste were subjected to a curing treatment for 24 hours under an atmosphere having a temperature of 40° C. and a humidity of 95%, followed by drying the plates, cutting the dried plates with a cutter and, then, separating the paired plates so as to obtain three kinds of cured positive plates. Further, three kinds of liquid type lead-acid batteries of size JIS D23 each having a 5-hour battery capacity of 40 Ah were manufactured by using each of the cured positive plates thus obtained in a method similar to that employed in each of Examples 14 to 16.

The charge-discharge operation was carried out 5000 times in respect of the lead-acid battery obtained in each of Examples 14 to 16 and Comparative Examples 9 to 11 under the accelerating condition specified in JIS D 5301 that the temperature for the light load test was elevated from 40° C. to 75° C. Then, each of the lead-acid batteries tested was dismantled so as to take out the positive electrode and to observe the state of the grid. Table 3 shows the results.

| | Heat treating conditions | Result of observation of substrate state | |
|---|---|---|---|
| | | State of corrosion | Elongation |
| Example 14 | 60° C.-3 hours | Deep grain boundary corrosion partly | Middle |
| Example 15 | 120° C.-3 hours | Slight grain boundary corrosion | Small |
| Example 16 | 180° C.-3 hours | Slight grain boundary corrosion | Middle |
| Comparative example 9 | 60° C.-3 hours | Corrosion in entire region, quite different from original shape | Large |
| Comparative example 10 | 120° C.-3 hours | Corrosion in entire region, quite different from original shape | Large |
| Comparative example 11 | 180° C.-3 hours | Corrosion in entire region, quite different from original shape | Large |

To reiterate, the lead-acid battery for each of Examples 14 to 16 comprises a positive electrode including a grid made of a lead-based alloy having a Sn/Ca weight ratio of at least 12, containing a prescribed amount of Ba, and having a heat treatment applied thereto at a prescribed temperature for a prescribed time after the casting and cooling step. As apparent from Table 3, the particular lead-acid battery permits suppressing the corrosion and elongation of the grid even after 5000 times of the charge discharge operation under the accelerating condition that the temperature for the life test is increased from 40° C. to 75° C. Particularly, the lead-acid battery for Example 15 comprising the positive electrode including the grid having a heat treatment applied thereto at 120° C. for 3 hours, which fall within the ranges of between 80° C. and 150° C. and between 1 hour and 10 hours specified in the present invention, permits further suppressing the corrosion and elongation of the grid.

On the other hand, the lead-acid battery for each of Comparative Examples 9 to 11 comprises a positive electrode including a grid made of a lead-based alloy containing 0.06% by weight of Ca, which is more than the lower limit of 0.05% by weight specified in the present invention, not containing Ba, and having a heat treatment applied thereto at a prescribed temperature for a prescribed time after the casting and cooling step. As apparent from Table 3, the particular lead-acid battery was severely corroded and greatly elongated after 5000 times of the charge discharge operation under the accelerating condition that the temperature for the life test was increased from 40° C. to 75° C.

Examples 17-1 to 17-4

A grid of the construction shown in FIG. 1 was manufactured by a gravity casting using a book mold, in which used was a lead-based alloy comprising Ca in an amount of 0.040% by weight, Sn in an amount of 1.00% by weight, Al in an amount of 0.020% by weight, Ba in an amount of 0.008% by weight, and the balance of Pb. In this case, a dispersion prepared by dispersing a cork powder having different particle diameters in water was used as a releasing agent. The mold was coated with the releasing agent thus prepared. As a result, obtained were grids having a surface roughness (Rz) of 10 μm, 15 μm, 25 μm and 45 μm, respectively. Then, each of the grids was age-hardened by applying a heat treatment at 100° C. for one hour.

In the next step, each of the grids was loaded by a known method with a positive electrode paste prepared by kneading a mixture consisting of a PbO powder and an aqueous solution of sulfuric acid. Then, the grid loaded with the positive electrode paste was cured for 24 hours in an atmosphere having a temperature of 40° C. and a humidity of 95%, followed by drying the cured plate so as to obtain four kinds of cured positive plates.

In the next step, a plate unit was prepared by combining the cured positive plate thus obtained with a cured negative plate with a polyethylene separator interposed therebetween. The cured negative plate noted above was prepared by loading by the known method a grid made of Pb with a negative electrode paste prepared by kneading a mixture consisting of a PbO powder, an additive such as lignin and an aqueous solution of sulfuric acid. The plate unit thus prepared was housed in a battery case, and a lid body was mounted on the battery case. Further, a dilute aqueous solution of sulfuric acid having a specific gravity of 1.250 was poured into the battery case so as to apply a formation, thereby manufacturing four kinds of six-cell mono-block lead-acid batteries each having a 5-hour rate battery capacity of 48 Ah. Each of these lead-acid batteries was a liquid type lead-acid battery comprising a large amount of a free liquid electrolyte.

Examples 18-1 and 18-2

Two kinds of lead-acid batteries were manufactured as in Examples 17-1 to 17-4, except that grids made of lead-based alloys having the compositions and the surface roughness (Rz) as shown in Table 4 were used as the grids for the positive electrodes.

Comparative examples 12-1, 12-2, 13-1 and 13-2

Four kinds of lead-acid batteries were manufactured as in Examples 17-1 to 17-4, except that grids made of lead-based alloys having the compositions and the surface roughness (Rz) as shown in Table 4 were used as the grids for the positive electrodes.

The lead-acid battery manufactured in each of Examples 17-1 to 17-4, 18-1, 18-2 and Comparative Examples 12-1, 12-2, 13-1, 13-2 was left to stand for 16 hours under an atmosphere of −15° C., followed by discharging the lead-acid battery with a current of 300 A until the battery voltage was lowered to 6 V so as to measure the battery voltage 30 seconds immediately after the start-up of the discharge. Table 4 shows the result.

TABLE 4

| | Alloy composition (% by weight) | | | | | Rz (μm) | Voltage 30 seconds later (V) |
|---|---|---|---|---|---|---|---|
| | Ca | Sn | Al | Ba | Pb | | |
| Example 17-1 | 0.040 | 1.00 | 0.020 | 0.008 | Balance | 10 | 9.72 |
| Example 17-2 | | | | | | 15 | 9.93 |
| Example 17-3 | | | | | | 25 | 9.99 |
| Example 17-4 | | | | | | 45 | 9.97 |
| Example 18-1 | 0.048 | 1.00 | 0.020 | 0.008 | Balance | 10 | 9.69 |
| Example 18-2 | | | | | | 25 | 9.91 |
| Comparative example 12-1 | 0.050 | 1.00 | 0.020 | — | Balance | 10 | 9.70 |
| Comparative example 12-2 | | | | | | 25 | 9.69 |
| Comparative example 13-1 | 0.070 | 1.00 | 0.020 | — | Balance | 10 | 9.72 |
| Comparative example 13-2 | | | | | | 25 | 9.66 |

As apparent from Table 4, the battery for Example 17-1, in which the grid had a surface roughness (Rz) of 10 μm, among the lead-acid batteries for Examples 17-1 to 17-4, exhibited a low battery voltage of 9.72 V when measured 30 seconds immediately after the start-up of the discharge. On the other hand, the battery for each of Examples 17-2, 17-3 and 17-4, in which the grid had a surface roughness not less than 15 μm, exhibited a high battery voltages of 9.93 to 9.99 V when measured 30 seconds immediately after the start-up of the discharge, supporting that these batteries were more excellent in the high current discharge characteristics.

Also, the grid used in the lead-based battery for each of Examples 18-1 and 18-2 was formed of a lead-based alloy in which the calcium content was increased to 0.048% by weight. In this case, the battery for Example 18-2 including the grid having a surface roughness (Rz) of 25 μm tended to exhibit a high battery voltage 30 seconds later, compared with the battery for Example 18-1 including a grid having a surface roughness (Rz) of 10 μm.

Incidentally, the lead-acid battery including a grid having a surface roughness (Rz) not less than 15 μm was found to exhibit a high battery voltage 30 seconds immediately after the start-up of the discharge, the battery voltage being substantially equal to that of the lead-acid battery for each of Examples 17-2 to 17-4, 18-1 and 18-2, even if the amounts of the components Ca, Sn, Al and Ba of the lead-based alloy used for preparing the grid were changed such that the Ca content was not less than 0.02% by weight and less than 0.05% by weight, the Sn content fell within a range of between 0.4 and 2.5% by weight, the Al content fell within a range of between 0.005 and 0.04% by weight, and the Ba content fell within a range of between 0.02 and 0.014% by weight. Also, the lead-acid battery comprising as a grid for a positive electrode plate a grid made of a lead-based alloy having at least one additional element selected from the group consisting of 0.005 to 0.07% by weight of Ag, 0.01 to 0.10% by weight of Bi and 0.001 to 0.05% by weight of Tl further added thereto and having a surface roughness of at least 15 μm was found to produce a satisfactory result, which was substantially equal to that produced in each of the Examples referred to above. Further, a satisfactory result was also obtained in the case where the lead-based alloy contained unavoidable impurities. Still further, the grid made of a lead-based alloy having the compositions falling within the ranges specified in the present invention was found to be particularly excellent in corrosion resistance and mechanical strength.

On the other hand, in the battery comprising as a grid for a positive electrode plate a grid formed of a lead-based alloy having a calcium content of 0.050% by weight or 0.070% weight as in each of Comparative Examples 12-1, 12-2, 13-1 and 13-2 was found to be low in battery voltage 30 seconds immediately after the start-up of the discharge even if the grid had a surface roughness (Rz) not less than 15 μm. Convenely, the battery voltage in question was found to be rendered lower than that in the case of using a grid having a surface roughness (Rz) less than 15 μm.

Example 19

A grid of the construction shown in FIG. 1 having a thickness of 1 mm was manufactured by a gravity casting using a book mold, in which was a used lead-based alloy comprising Ca in an amount of 0.040% by weight, Sn in an amount of 1.00% by weight, Al in an amount of 0.020% by weight, Ba in an amount of 0.008% by weight, and the balance of Pb. In this case, a large number of six kinds of grids were cast having 1 mm, 2 mm, 4.5 mm, 6.5 mm, 10 mm and 15 mm as the effective diameter of the mesh of lattice, i.e., the value obtained by dividing four times the area of a polygon by the circumferential length of the polygon. Then, each of the grids was age-hardened by applying a heat treatment at 100° C. for one hour.

In the next step, each of the grids was loaded by a known method with a positive electrode paste prepared by kneading a mixture consisting of a PbO powder and an aqueous solution of sulfuric acid. Then, the grid loaded with the positive electrode paste was cured for 24 hours in an atmosphere having a temperature of 40° C. and a humidity of 95%, followed by drying the cured plate so as to obtain six kinds of cured positive plates.

In the next step, a plate unit was prepared by combining the cured positive plate thus obtained with a cured negative plate with a polyethylene separator interposed therebetween. The cured negative plate noted above was prepared by loading by the known method a grid made of Pb with a negative electrode paste prepared by kneading a mixture consisting of a PbO powder, an additive such as lignin and an aqueous solution of sulfuric acid. The plate unit thus prepared was housed in a battery case, and a lid body was mounted on the battery case. Further, a dilute aqueous solution of sulfuric acid having a specific gravity of 1.250 was poured into the battery case so as to apply a formation, thereby manufacturing six kinds of six-cell mono-block lead-acid batteries each having a 5-hour rate battery capacity of 48 Ah. Each of these lead-acid batteries was a liquid-type lead-acid battery comprising a large amount of a free liquid electrolyte.

Comparative Example 14

A grid of the construction shown in FIG. 1 and having a thickness of 1 mm was manufactured by a gravity casting using a book mold, in which was used a lead-based alloy comprising Ca in an amount of 0.040% by weight, Sn in an amount of 1.00% by weight, Al in an amount of 0.020% by weight, and the balance of Pb. In this case, a large number of six kinds of grids were cast having 1 mm, 2 mm, 4.5 mm, 6.5 mm, 10 mm and 15 mm as the effective diameter of the mesh of lattice, i.e., the value obtained by dividing four times the area of a polygon by the circumferential length of the polygon. Then, each of the grids was age-hardened by applying a heat treatment at 100° C. for one hour. Then, each of the grids was loaded by a known method with a positive electrode paste prepared by kneading a mixture consisting of a PbO powder and an aqueous solution of sulfuric acid. Further, the grids each loaded with the positive electrode paste were cured for 24 hours in an atmosphere having a temperature of 40° C. and a humidity of 95%, followed by drying the grids so as to obtain six kinds of the cured positive plates.

Six kinds of liquid-type lead-acid batteries each having a 5-hour battery capacity of 40 Ah were manufactured as in Example 19 by using the cured positive plates.

Figure 14:
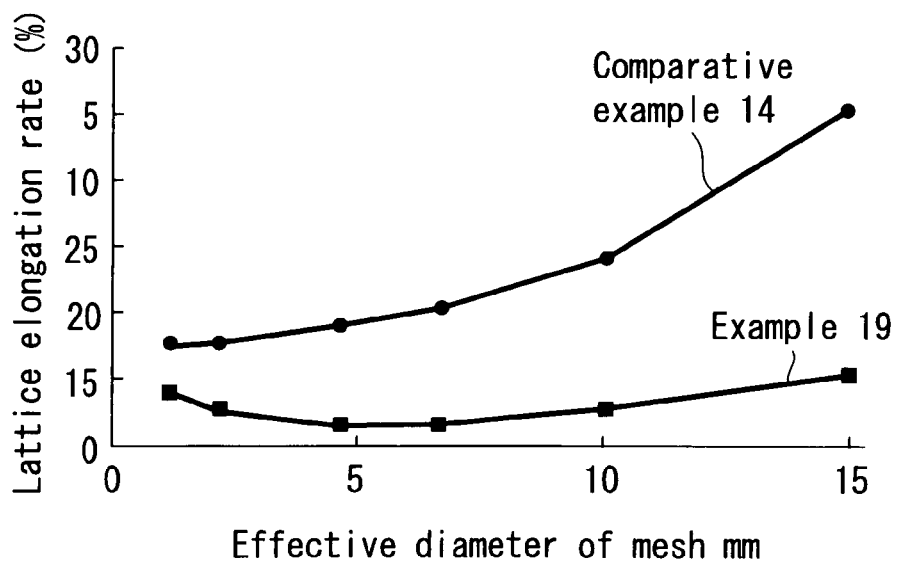
FIG. 14 is a graph showing the relationship between the effective diameter of the mesh and the elongation in the grid of the positive electrode after 1,000 times of the charge-discharge operations in the life test in respect of the lead-acid batteries for Example 18 of the present invention and Comparative Example 15.

The lead-acid battery obtained in each of Example 19 and Comparative Example 14 was subjected to the charge-discharge operation 1000 times under the accelerating condition specified in JIS D 5301 that the temperature for the life test is increased from 40° C. to 75° C. Then, each of the lead-acid batteries was dismantled so as to take out the positive electrode plate and to measure the elongation of the grid. FIG. 14 is a graph showing the results. In the graph of FIG. 14, the elongation is plotted on the ordinate, and the effective diameter of the mesh of the lattice of the grid is plotted on the abscissa.

As apparent from FIG. 14, the elongation of the grid for the lead-acid battery for Example 19 was found to be less than that for the lead-acid battery for Comparative Example 14 after 1,000 times of the charge-discharge operation under the accelerating condition that the temperature for the life test was increased from 40° C. to 75° C. Particularly, FIG. 14 supports that, in the lead-acid battery for Example 19, the elongation is most reduced when the effective diameter of the mesh of the grid falls within a range of between two times and 10 times as much as the thickness of the grid. It is considered reasonable to understand that, where the effective diameter of the mesh noted above falls within the range noted above, the elongation caused by the corrosion of the grid itself is small and the influence given to the expansion-shrinkage of the active material caused by the charge-discharge operation is moderated by the increase in the effective diameter of the mesh so as to lower the elongation of the grid.

On the other hand, when it comes to the battery for Comparative Example 14 using as a grid for a positive electrode plate the grid made of a lead-based alloy containing 0.06% by weight of Ca, which is higher than the upper limit of 0.05% by weight specified in the present invention, and not containing Ba, the elongation of the grid was found to be large. Also, the increase in the elongation of the grid was rendered prominent in the case where the effective diameter of the mesh was not less than two times as much as the thickness of the grid. It is considered reasonable to understand that the elongation caused by the corrosion of the grid itself was much greater than the moderating function exerted on the expansion-shrinkage of the active material and produced by the increase in the effective diameter of the mesh so as to bring about a high elongation of the grid.

Incidentally, the lead-acid battery comprising as a grid for a positive electrode plate the grid made of a lead-based alloy in which the Ca content was changed within a range of between 0.02% by weight and was less than 0.05% by weight, the Sn content was changed within a range of between 0.4% by weight and 2.5% by weight, the Al content was changed within a range of between 0.005% by weight and 0.04% by weight, and the Ba content was changed within a range of between 0.002% by weight and 0.014% by weight was found to be substantially equal to the lead-acid battery for Example 19 so as to make it possible to suppress the elongation of the grid after the charge-discharge operation under the accelerating condition. Also, the lead-acid battery comprising as a grid for a positive electrode plate the grid made of a lead-based alloy having at least one additional element selected from the group consisting of Ag in an amount of 0.005 to 0.07% by weight, Bi in an amount of 0.01 to 0.10% by weight and Tl in an amount of 0.001 to 0.05% by weight was found to be substantially equal to the lead-acid battery for Example 19 so as to obtain a satisfactory result. Further, a satisfactory result can be similarly obtained even if unavoidable impurities are contained in the lead-based alloy.

As pointed out above, Example 19 supports that the elongation of the grid can be suppressed in the present invention. Also, where an elongation substantially equal to that in the prior art is acceptable, it is possible to set the effective diameter of the mesh at a level several times to scores of times as much as the thickness of the grid so as to coarsen the vertical lattice and the lateral lattice, with the result that the weight of the grid can be decreased.

Incidentally, where the effective diameter of the mesh is equal to the thickness of the grid, the mass of the grid is relatively increased, resulting in failure to decrease the weight of the grid. Such being the situation, the effective diameter of the mesh is required to be at least twice as much as the thickness of the grid.

As described above in detail, the present invention provides a lead-based alloy for a lead-acid battery in which the Ca content and the Ba content of the alloy are defined to fall within prescribed ranges so as to allow the alloy to be excellent in both corrosion resistance and mechanical strength.

Also, the grid for a lead-based battery of the present invention can be used stably for a long time under severe temperature conditions so as to make it possible to provide a lead-acid battery of long life by incorporating the grid noted above into the positive electrode plate included in the lead-acid battery. Further, a lead-acid battery low in weight can be prepared by defining the mesh of the grid for a lead-acid battery of the present invention. As a result, it is possible to markedly improve the battery for use in industries such as the vehicle industry and IT industry.

Further, the lead-acid battery of the present invention is capable of achieving large current charge-discharge characteristics in, for example, a battery voltage elevation to 36V as well as in hybrid vehicles and UPS (uninterruptible power systems) so as to contribute greatly to the expansion of use of the battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lead-acid battery comprising:
   an electrolyte containing an aqueous solution of sulfuric acid;
   a positive electrode including a grid, an active material layer containing PbO powder and sulfuric acid, and a corrosion layer which suppresses permeation of the electrolyte into the grid and which is formed at the interface between the grid and the active material layer; and
   a negative electrode;
   wherein the grid is made of a lead-based alloy consisting of not less than 0.02% and not more than 0.045% by weight of calcium, not less than 0.4% and not more than 2.5% by weight of tin, not less than 0.005% and not more than 0.04% by weight of aluminum, not less than 0.002% and not more than 0.014% by weight of barium, and a balance of lead and unavoidable impurities.

2. A lead-acid battery according to claim 1, wherein the lead-based alloy contains tin in an amount at least 12 times as much in weight as calcium and, after casting said alloy into a shape of the grid, a heat treatment is applied to the lead-based alloy at 80 to 150° C. for 1 to 10 hours.

3. A lead-acid battery according to claim 1, wherein the grid has a surface roughness not less than 15 μm.

4. A lead-acid battery according to claim 1, wherein the grid is in a shape of a lattice, and an effective diameter of the mesh of the lattice, which represents a value obtained by dividing 4 times the area of a polygon by the circumferential length of the polygon, is at least two times as much as the thickness of the grid.

5. A lead-acid battery according to claim 4, wherein the effective diameter of the mesh of the lattice falls within a range of between 2 times and 10 times as much as the thickness of the grid.

6. A lead-acid battery according to claim 1, wherein the calcium is in an amount of 0.03 to 0.045% by weight.

7. A lead-acid battery according to claim 1, wherein the grid has a surface roughness not less than 15 μm, and an effective diameter of a mesh of the lattice, which represents a value obtained by dividing 4 times the area of a polygon by the circumferential length of the polygon, is at least two times as much as the thickness of the grid.

8. A lead-acid battery comprising:
   an electrolyte containing an aqueous solution of sulfuric acid;
   a positive electrode including a grid, an active material layer containing PbO powder and sulfuric acid, and a corrosion layer which suppresses permeation of the electrolyte into the grid and which is formed at the interface between the grid and the active material layer; and
   a negative electrode;
   wherein the grid is made of a lead-based alloy consisting of not less than 0.02% and not more than 0.045% by weight of calcium, not less than 0.4% and not more than 2.5% by weight of tin, not less than 0.005% and not more than 0.04% by weight of aluminum, not less than 0.002% and not more than 0.014% by weight of barium, and at least one additional element selected from the group consisting of silver in an amount falling within a range of between 0.005% by weight and 0.07% by weight, bismuth in an amount falling within a range of between 0.01% by weight and 0.10% by weight, and thallium in an amount falling within a range between 0.001% by weight and 0.05% by weight, and a balance of lead and unavoidable impurities.

9. A lead-acid battery according to claim 8, wherein the calcium is in an amount of 0.03 to 0.045% by weight.

* * * * *